US012693308B2

(12) United States Patent
Tanaka

(10) Patent No.: US 12,693,308 B2
(45) Date of Patent: Jul. 28, 2026

(54) PHYSICAL QUANTITY SENSOR AND INERTIAL MEASUREMENT UNIT

(71) Applicant: SEIKO EPSON CORPORATION, Tokyo (JP)

(72) Inventor: Satoru Tanaka, Chino (JP)

(73) Assignee: SEIKO EPSON CORPORATION (JP)

( * ) Notice: Subject to any disclaimer, the term of this patent is extended or adjusted under 35 U.S.C. 154(b) by 293 days.

(21) Appl. No.: 18/357,303

(22) Filed: Jul. 24, 2023

(65) Prior Publication Data

US 2024/0027489 A1 Jan. 25, 2024

(30) Foreign Application Priority Data

Jul. 25, 2022 (JP) ................................. 2022-117925

(51) Int. Cl.
*G01P 15/125* (2006.01)
*G01P 15/08* (2006.01)

(52) U.S. Cl.
CPC .... *G01P 15/125* (2013.01); *G01P 2015/0831* (2013.01)

(58) Field of Classification Search
CPC ..... G01P 2015/0828; G01P 2015/0831; G01P 2015/0837
See application file for complete search history.

(56) References Cited

U.S. PATENT DOCUMENTS

| | | | | |
|---|---|---|---|---|
| 2002/0158293 A1* | 10/2002 | Lee | ..................... | G01C 19/5755 257/414 |
| 2003/0106372 A1* | 6/2003 | Adams | ................ | G01P 15/0802 73/514.32 |
| 2007/0119252 A1* | 5/2007 | Adams | .................. | G01P 15/125 73/514.32 |
| 2010/0281980 A1* | 11/2010 | Yazawa | ............... | G01P 15/0802 73/514.32 |
| 2011/0203372 A1 | 8/2011 | Foster | | |

(Continued)

FOREIGN PATENT DOCUMENTS

| | | | | | |
|---|---|---|---|---|---|
| CN | 110824196 A | * | 2/2020 | ......... | G01P 15/0802 |
| EP | 2269000 B1 | * | 5/2017 | ............. | G01P 1/023 |

(Continued)

*Primary Examiner* — Stephen D Meier
*Assistant Examiner* — Ruben C Parco, Jr.
(74) *Attorney, Agent, or Firm* — Harness, Dickey & Pierce, P.L.C.

(57) ABSTRACT

A physical quantity sensor includes a fixed portion, a support beam, a movable body, a first fixed electrode portion, and a second fixed electrode portion. The movable body includes a first coupling portion, a first base portion, a first movable electrode portion, a second coupling portion, a second base portion, and a second movable electrode portion. The first base portion is coupled to the first coupling portion. A first movable electrode of the first movable electrode portion extends from the first base portion in a first direction, and faces a first fixed electrode of the first fixed electrode portion in a second direction. The second base portion is coupled to the second coupling portion. A second movable electrode of the second movable electrode portion extends from the second base portion in the first direction, and faces a second fixed electrode of the second fixed electrode portion in the second direction.

9 Claims, 26 Drawing Sheets

(56)                    References Cited

U.S. PATENT DOCUMENTS

| | | | | |
|---|---|---|---|---|
| 2015/0022431 A1* | 1/2015 | Mahameed | .......... | G06F 1/1694 |
| | | | | 310/300 |
| 2016/0187369 A1* | 6/2016 | Tseng | ................... | G01P 15/125 |
| | | | | 73/514.01 |
| 2021/0065990 A1 | 3/2021 | Fujimoto et al. | | |

FOREIGN PATENT DOCUMENTS

| | | | |
|---|---|---|---|
| JP | 2011-169889 A | 9/2011 |
| JP | 2021-032819 A | 3/2021 |

* cited by examiner

PHYSICAL QUANTITY SENSOR AND INERTIAL MEASUREMENT UNIT

The present application is based on, and claims priority from JP Application Serial Number 2022-117925, filed Jul. 25, 2022, the disclosure of which is hereby incorporated by reference herein in its entirety.

BACKGROUND

1. Technical Field

The present disclosure relates to a physical quantity sensor and an inertial measurement unit.

2. Related Art

JP-A-2021-032819 discloses a physical quantity sensor that detects an acceleration in a Z direction. It is disclosed that, in the physical quantity sensor, a length of one of a plurality of first electrodes along a first direction is smaller than a length of a first conductive portion along the first direction of the first conductive portion. Further, it is disclosed that, in the physical quantity sensor, a length of one of a plurality of second electrodes along the first direction is smaller than a length of a second conductive portion along the first direction of the second conductive portion.

In the physical quantity sensor disclosed in JP-A-2021-032819, distances from a coupling portion, which is a torsion spring, to comb tooth electrodes provided at both sides of the coupling portion are different from each other, and there is a possibility that linearity of positive and negative detection characteristics may be abnormal.

SUMMARY

An aspect of the present disclosure relates to a physical quantity sensor that detects, when three directions orthogonal to one another are defined as a first direction, a second direction, and a third direction, a physical quantity in the third direction, and the physical quantity sensor includes: a fixed portion fixed at a substrate; a support beam having one end coupled to the fixed portion and provided along the second direction; a movable body coupled to the other end of the support beam; and a first fixed electrode portion and a second fixed electrode portion which are provided at the substrate. The movable body includes: a first coupling portion coupled to the other end of the support beam and extending from the support beam in the first direction; a first base portion coupled to the first coupling portion and provided along the second direction; a first movable electrode portion including a first movable electrode, the first movable electrode extending from the first base portion in the first direction and facing a first fixed electrode of the first fixed electrode portion in the second direction; a second coupling portion coupled to the other end of the support beam and extending from the support beam in a fourth direction opposite to the first direction; a second base portion coupled to the second coupling portion and provided along the second direction; and a second movable electrode portion including a second movable electrode, the second movable electrode extending from the second base portion in the first direction and facing a second fixed electrode of the second fixed electrode portion in the second direction. Another aspect of the present disclosure relates to an inertial measurement unit including: the physical quantity sensor described above; and a control unit configured to perform control based on a detection signal output from the physical quantity sensor.

BRIEF DESCRIPTION OF THE DRAWINGS

FIG. 3 is a perspective view of a detection part of the physical quantity sensor according to the embodiment.

FIG. 4 is a diagram illustrating an operation of the detection part of the physical quantity sensor according to the embodiment.

FIG. 11 is a diagram illustrating an operation of the detection part in the modification of the first detailed example.

FIG. 17 is a diagram illustrating an operation of a detection part in the fourth detailed example.

FIG. 18 is a diagram illustrating an operation of a detection part in a modification of the fourth detailed example.

FIG. 25 is an exploded perspective view illustrating a schematic configuration of an inertial measurement unit including a physical quantity sensor.

DESCRIPTION OF EMBODIMENTS

Hereinafter, an embodiment will be described. The embodiment to be described below does not unduly limit contents described in the claims. All configurations described in the embodiment are not necessarily essential constituent elements.

1. Physical Quantity Sensor

Figure 1:
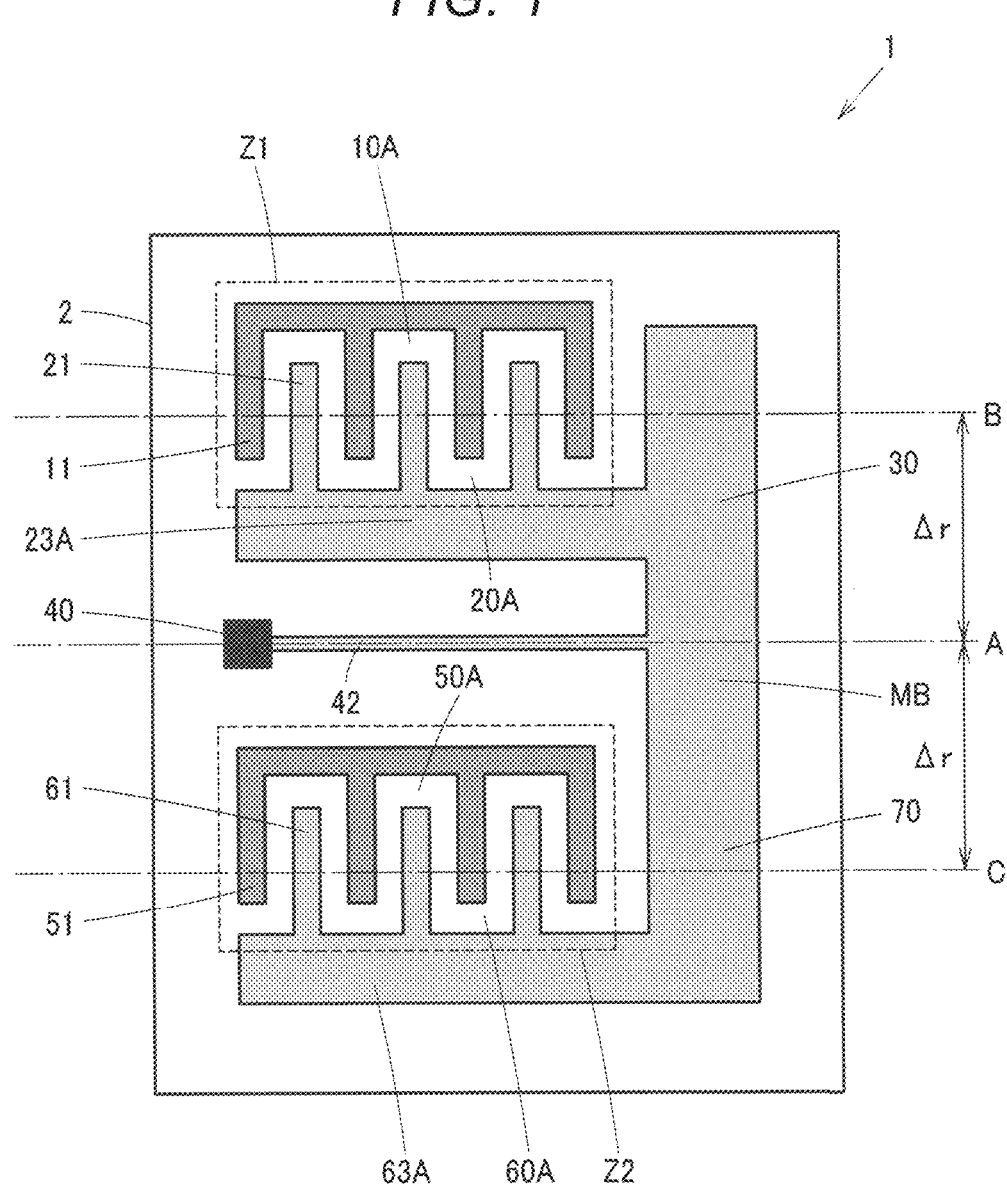
FIG. 1 is a plan view of a physical quantity sensor according to an embodiment.
Figure 1:
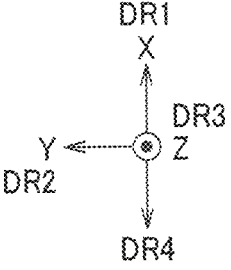

A physical quantity sensor 1 according to the embodiment will be described using an acceleration sensor that detects an acceleration in a vertical direction as an example. FIG. 1 is a plan view of the physical quantity sensor 1 according to the embodiment in a plan view in a direction orthogonal to a substrate 2. The physical quantity sensor 1 is a micro electro mechanical system (MEMS) device, and is, for example, an inertial sensor.

In FIG. 1 and FIGS. 2 to 24 to be described later, for convenience of description, dimensions of respective members, intervals between the members, and the like are schematically illustrated, and not all the components are illustrated. For example, an electrode wiring, an electrode terminal, and the like are not illustrated. In the following description, a case where a physical quantity detected by the physical quantity sensor 1 is an acceleration will be mainly described as an example. The physical quantity is not limited to the acceleration, and may be another physical quantity such as a velocity, pressure, displacement, a posture, an angular velocity, or gravity, and the physical quantity sensor 1 may be used as a pressure sensor, a MEMS switch, or the like. In FIG. 1, directions orthogonal to one another are defined as a first direction DR1, a second direction DR2, and a third direction DR3. The first direction DR1, the second direction DR2, and the third direction DR3 are, for example, an X-axis direction, a Y-axis direction, and a Z-axis direction, respectively, but are not limited thereto. For example, the third direction DR3 corresponding to the Z-axis direction is a direction orthogonal to the substrate 2 of the physical quantity sensor 1 and is, for example, the vertical direction. A direction opposite to the third direction DR3 is defined as a fifth direction DR5. The first direction DR1 corresponding to the X-axis direction and the second direction DR2 corresponding to the Y-axis direction are directions orthogonal to the third direction DR3, and an XY plane that is a plane along the first direction DR1 and the second direction DR2 is, for example, along a horizontal plane. A direction opposite to the first direction DR1 is defined as a fourth direction DR4, and the fourth direction DR4 is, for example, a −X-axis direction. The term "orthogonal" includes not only a case of intersecting at 90° but also a case of intersecting at an angle slightly deviated from 90°.

The substrate 2 is, for example, a silicon substrate made of semiconductor silicon or a glass substrate made of a glass material such as borosilicate glass. However, a constituent material of the substrate 2 is not particularly limited, and a quartz substrate, a silicon on insulator (SOI) substrate, or the like may be used.

As illustrated in FIG. 1, the physical quantity sensor 1 according to the embodiment includes a fixed portion 40, a support beam 42, a movable body MB, a first fixed electrode portion 10A, and a second fixed electrode portion 50A. The movable body MB includes a first coupling portion 30, a first base portion 23A, a first movable electrode portion 20A, a second coupling portion 70, a second base portion 63A, and a second movable electrode portion 60A. The first fixed electrode portion 10A includes a plurality of first fixed electrodes 11, and the second fixed electrode portion 50A includes a plurality of second fixed electrodes 51. The first movable electrode portion 20A includes a plurality of first movable electrodes 21, and the second movable electrode portion 60A includes a plurality of second movable electrodes 61.

As indicated by a broken-line frame in FIG. 1, the physical quantity sensor 1 includes a detection part Z1 and a detection part Z2, and the detection parts detect a physical quantity such as an acceleration in a direction along the third direction DR3 that is the Z-axis direction. The detection parts Z1 and Z2 are provided at a first direction DR1 side and a fourth direction DR4 side of the support beam 42, respectively, in a plan view.

The detection part Z1 provided at the first direction DR1 side of the support beam 42 includes the first fixed electrode portion 10A and the first movable electrode portion 20A. The detection part Z2 provided at the fourth direction DR4 side of the support beam 42 includes the second fixed electrode portion 50A and the second movable electrode portion 60A.

Figure 2:
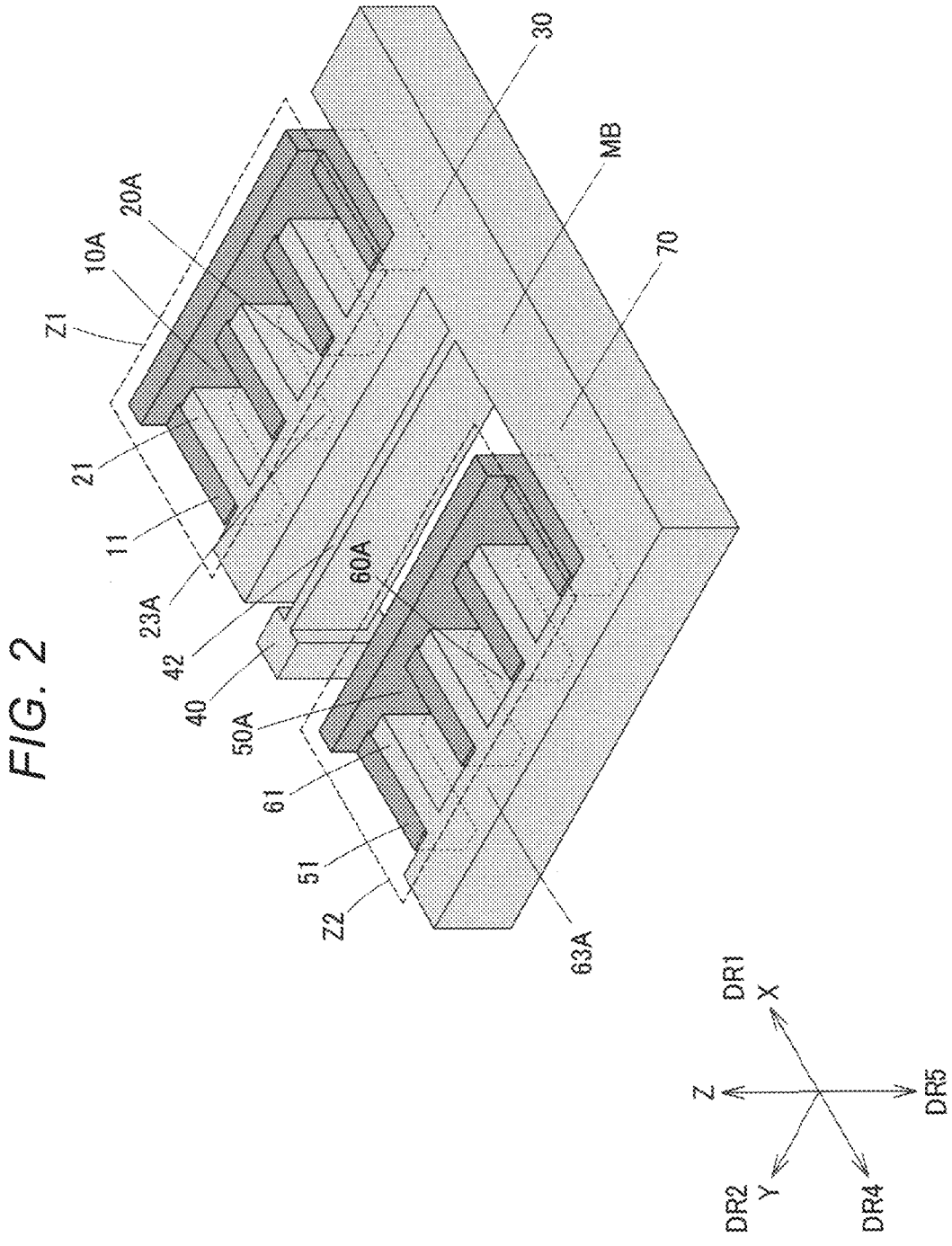
FIG. 2 is a perspective view of the physical quantity sensor according to the embodiment.

FIG. 2 is a perspective view of the physical quantity sensor 1 according to the embodiment. The fixed portion 40 serves as an anchor for a seesaw movement of the movable body MB to be described later with reference to FIG. 3. The fixed portion 40 is provided at the substrate 2 as illustrated in FIG. 2. The fixed portion 40 fixes one end of the support beam 42 to the substrate 2. The other end of the support beam 42 is coupled to the first coupling portion 30 and the second coupling portion 70 of the movable body MB. In this way, the fixed portion 40 couples the movable body MB to the substrate 2 via the support beam 42.

The support beam 42 applies a restoring force in the seesaw movement of the movable body MB. As illustrated in FIG. 2, the one end of the support beam 42 is coupled to a part of the fixed portion 40. The other end of the support beam 42 is coupled to the first coupling portion 30 and the second coupling portion 70. In this way, the support beam 42 couples the fixed portion 40 and the movable body MB. The support beam 42 is, for example, a torsion spring. As illustrated in FIG. 1, the support beam 42 is provided such that, for example, the second direction DR2 is a longitudinal direction thereof in the plan view. As illustrated in FIG. 2, the support beam 42 has a small thickness in the first direction DR1, and bends in response to the seesaw movement of the movable body MB to be described later with reference to FIG. 3. Then, the support beam 42 is twisted, for example, on the Y axis that is the second direction DR2, thereby generating a restoring force in the seesaw movement of the movable body MB. As described above, in the embodiment, the support beam 42 is a torsion spring twisted with the second direction DR2 as a rotation axis. In this way, the movable body MB can perform a swing movement with the second direction DR2 as a rotation axis.

The movable body MB performs the seesaw movement around the rotation axis along the second direction DR2, for example. That is, the movable body MB performs the seesaw movement by using torsion of the support beam 42 described above as a restoring force in a rotational movement around the second direction DR2. Accordingly, the first movable electrode portion 20A and the second movable electrode portion 60A of the movable body MB are also movable, and detection of a physical quantity is performed. Hereinafter, the seesaw movement of the movable body MB is also referred to as a swing movement.

The first coupling portion 30 couples the other end of the support beam 42, which is not coupled to the fixed portion 40, and the first base portion 23A. The second coupling portion 70 couples the other end of the support beam 42 and the second base portion 63A. The first coupling portion 30 extends to the first direction DR1 side of the support beam 42, and is coupled to the first base portion 23A at the first direction DR1 side of the support beam 42. The second coupling portion 70 extends to the fourth direction DR4 side of the support beam 42, and is coupled to the second base portion 63A at the fourth direction DR4 side of the support beam 42. In this way, the first coupling portion 30 couples the first base portion 23A such that the first base portion 23A is at a fixed distance from the support beam 42 serving as the rotation axis of the seesaw movement of the movable body MB, and the second coupling portion 70 couples the second base portion 63A such that the second base portion 63A is at a fixed distance from the support beam 42.

The first base portion 23A forms a base portion of the first movable electrodes 21 of the first movable electrode portion 20A. That is, as illustrated in FIG. 1, in the plan view, the plurality of first movable electrodes 21 extend from the first base portion 23A, which is the base portion, to the first direction DR1 side. The first base portion 23A is coupled to the support beam 42 by the first coupling portion 30 so as to be positioned at the fixed distance from the rotation axis of the movable body MB.

The second base portion 63A forms a base portion of the second movable electrodes 61 of the second movable electrode portion 60A. The second base portion 63A in the detection part Z2 plays the same role as the first base portion 23A in the detection part Z1. That is, in the plan view, the plurality of second movable electrodes 61 extend from the second base portion 63A to the first direction DR1 side. The second base portion 63A is coupled to the support beam 42 by the second coupling portion 70 so as to be positioned at the fixed distance from the rotation axis of the movable body MB.

With such a configuration, the first base portion 23A, together with the first coupling portion 30, couples the first movable electrodes 21 of the first movable electrode portion 20A so as to be at the fixed distance from the rotation axis of the seesaw movement of the movable body MB. The second base portion 63A, together with the second coupling portion 70, couples the second movable electrodes 61 of the second movable electrode portion 60A so as to be at the fixed distance from the rotation axis of the seesaw movement.

Further, as illustrated in FIG. 1, when a distance from the support beam 42 corresponding to the rotation axis of the movable body MB to a center of the first movable electrode portion 20A is defined as Δr, a distance from the support beam 42 to a center of the second movable electrode portion 60A is also Δr. That is, in the plan view, the first movable electrode portion 20A and the second movable electrode portion 60A are disposed at symmetrical positions with respect to the Y axis parallel to the support beam 42. The first movable electrode 21 of the first movable electrode portion 20A extends from the first base portion 23A in the first direction DR1, and the second movable electrode 61 of the second movable electrode portion 60A also extends from the second base portion 63A in the first direction DR1. In this way, the first movable electrode 21 and the second movable electrode 61 extend in the same direction from the respective base portions, and centers thereof are at the same distance from the support beam 42. Here, the center of each electrode portion refers to a center position in a physical distance or a gravity center position of each electrode portion. That is, it is sufficient that the center positions of the respective electrode portions in the physical distance or the gravity center positions of the respective electrode portions are symmetrical with respect to the support beam 42. In the above description, equal distances also include a state where the distances are substantially equal. This is because, for example, in a case of performing etching in a semiconductor manufacturing process, even when etching is performed with the same apparatus and under the same conditions, variations in finished dimensions normally occur due to the apparatus.

The first fixed electrode 11 of the first fixed electrode portion 10A and the first movable electrode 21 of the first movable electrode portion 20A are probe electrodes of the detection part Z1. The first fixed electrode 11 of the first fixed electrode portion 10A is a probe electrode fixed to the substrate 2, and the first movable electrode 21 of the first movable electrode portion 20A is a probe electrode that can move integrally with the movable body MB. The detection of the physical quantity can be performed with the first fixed electrode 11 of the first fixed electrode portion 10A and the first movable electrode 21 of the first movable electrode portion 20A.

The first fixed electrode portion 10A is fixed at the substrate 2. As illustrated in FIGS. 1 and 2, the first fixed electrode portion 10A is provided at the first direction DR1 side of the first base portion 23A. The first fixed electrode portion 10A is provided with the comb teeth-shaped first fixed electrodes 11 extending to the fourth direction DR4 side. The first movable electrode portion 20A is provided with the comb teeth-shaped first movable electrodes 21 extending to the first direction DR1 side of the first base portion 23A. Hereinafter, the first fixed electrodes 11, the second fixed electrodes 51, the first movable electrodes 21, and the second movable electrodes 61 are collectively referred to as probe electrodes as appropriate.

Figure 3:
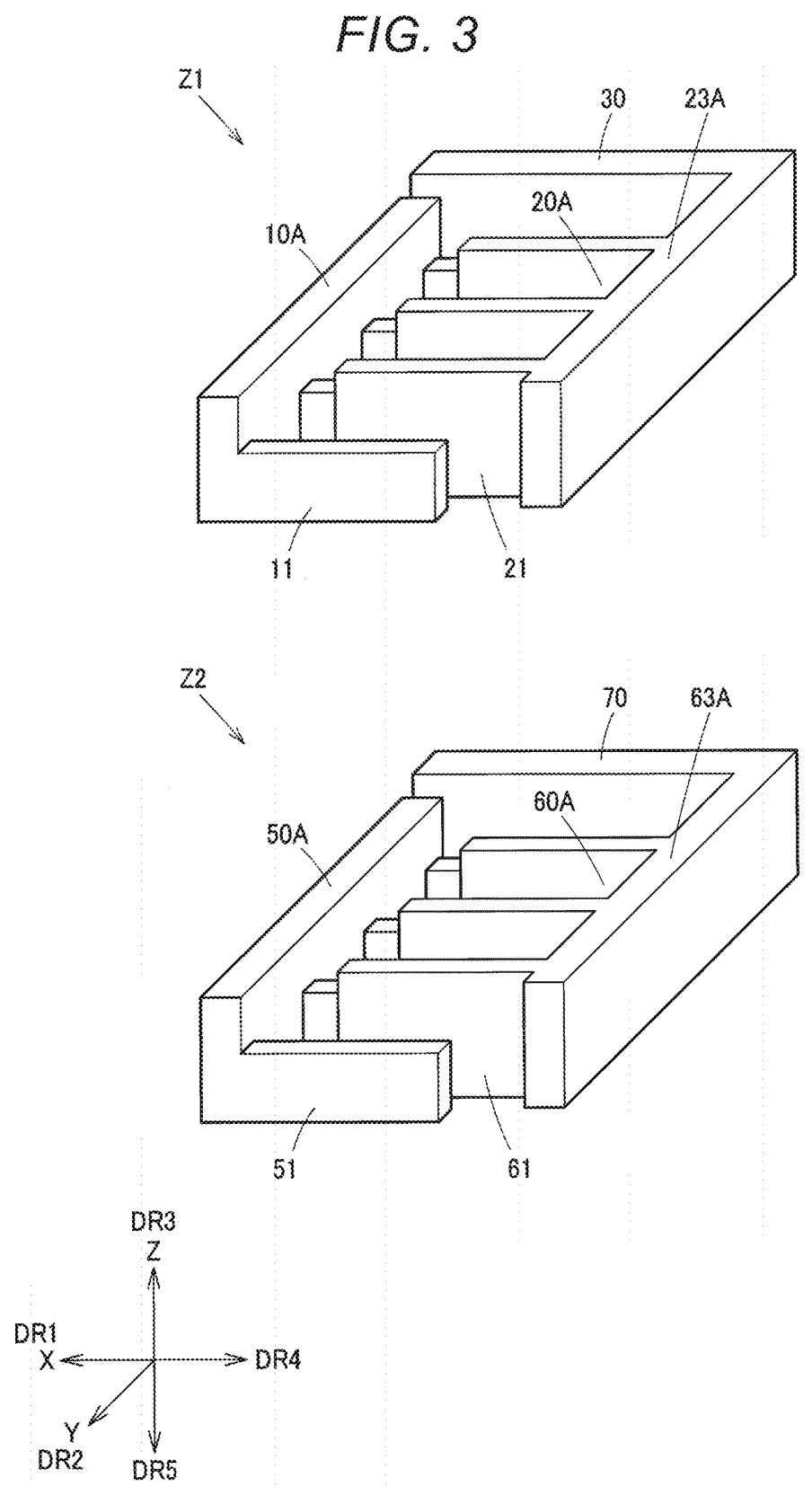

FIG. 3 is a perspective view illustrating a configuration of the probe electrodes in the detection part Z1 and the detection part Z2 in an initial state according to the embodiment. Here, the initial state refers to a stationary state, that is, a state in which no acceleration occurs except for the gravitational acceleration. An upper part of FIG. 3 shows a shape and a positional relationship of the first fixed electrode 11 and the first movable electrode 21 in the detection part Z1. In the detection part Z1, the first movable electrodes 21 are alternately provided with the first fixed electrodes 11 facing the first fixed electrodes 11 in the second direction DR2. The number of the first fixed electrodes 11 and the number of the first movable electrodes 21 can be freely set. Focusing on a thickness of each probe electrode in the third direction DR3, a thickness of the first movable electrode 21 is larger than a thickness of the first fixed electrode 11. Here, the thickness is not limited to, for example, a physical thickness of an element obtained by measuring a cross section thereof using a scanning electron microscope (SEM) or the like, and includes a film thickness of a thin film estimated based on optical characteristics such as a refractive index thereof. Ends of the first movable electrode 21 and the first fixed electrode 11 in the fifth direction DR5 are flush with each other. Therefore, an end of the first movable electrode 21 on a third direction DR3 side is positioned on the third direction DR3 side with respect to an end of the first fixed electrode 11 on the third direction DR3 side. That is, in the detection part Z1, the probe electrodes have a one-side offset structure in which the end of the first movable electrode 21 protrudes further than the end of the first fixed electrode 11 on the third direction DR3 side, and the end of the first movable electrode 21 is flush with the end of the first fixed electrode 11 on a fifth direction DR5 side.

A lower part of FIG. 3 illustrates a shape and a positional relationship of the second fixed electrode 51 of the second fixed electrode portion 50A and the second movable electrode 61 of the second movable electrode portion 60A in the detection part Z2. Similarly to the detection part Z1 illustrated in the upper part of FIG. 3, the probe electrodes in the detection part Z2 also have a one-side offset structure. The second fixed electrode 51 and the second movable electrode 61 in the detection part Z2 correspond to the first fixed electrode 11 and the first movable electrode 21 in the detection part Z1, respectively, and a thickness of the second movable electrode 61 is larger than a thickness of the second fixed electrode 51. In the one-side offset structure, on the third direction DR3 side, an end of the second movable electrode 61 protrudes further than an end of the second fixed electrode 51. In addition, as in the case of the detection part Z1, the number of the second fixed electrodes 51 having a comb tooth shape and the number of the second movable electrodes 61 having a comb tooth shape can be freely set.

That is, in the embodiment, positions of back surfaces of the first movable electrode portion 20A and the first fixed electrode portion 10A in the third direction DR3 coincide with each other, and positions of back surfaces of the second movable electrode portion 60A and the second fixed electrode portion 50A in the third direction DR3 coincide with each other.

In this way, by forming electrode materials constituting the first movable electrode 21, the first fixed electrode 11, the second movable electrode 61, and the second fixed electrode 51 in the same process, it is possible to implement a configuration in which the back surfaces of the probe electrodes are flush with each other. Since the electrodes can be formed by processing such as etching, the manufacturing process can be facilitated.

Figure 4:
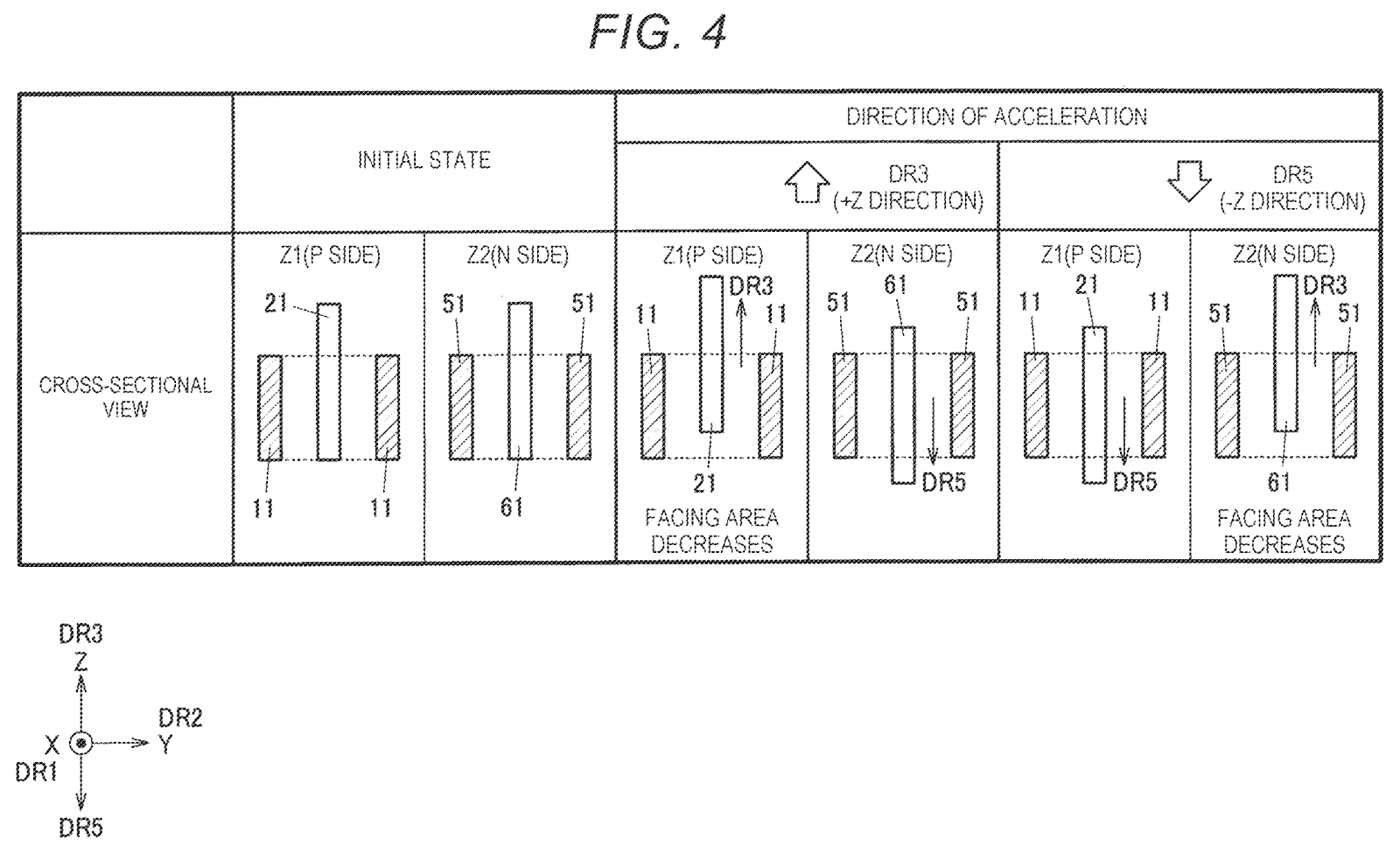

FIG. 4 is a diagram illustrating operations of the detection parts Z1 and Z2 of the physical quantity sensor 1 according to the embodiment. Specifically, movement of the probe electrodes with respect to a direction of an acceleration when the acceleration occurs from an initial state is shown in a schematic view of a cross section as viewed from the first direction DR1. Here, the initial state refers to a stationary state in which no acceleration occurs except for the gravitational acceleration as described with reference to FIG. 3. The detection part Z1 corresponds to a P side of a probe, and the detection part Z2 corresponds to an N side of the probe.

First, in the initial state illustrated in a left column of FIG. 4, the first fixed electrode 11 and the first movable electrode 21 in the detection part Z1 face each other so as to partially overlap each other along the third direction DR3. Specifically, the positions of the ends of the first fixed electrode 11 and the first movable electrode 21 in the fifth direction DR5 coincide with each other, but the position of the end of the first movable electrode 21 in the third direction DR3 is on the third direction DR3 side with respect to the position of the end of the first fixed electrode 11 in the third direction DR3. In the initial state, the first fixed electrode 11 and the first movable electrode 21 are stationary in a state of partially overlapping each other along the third direction DR3. In addition, the second fixed electrode 51 and the second movable electrode 61 in the detection part Z2 also face each other so as to partially overlap each other along the third direction DR3. The end of the second movable electrode 61 in the third direction DR3 is located on the third direction DR3 side with respect to the end of the second fixed electrode 51 in the third direction DR3.

In this initial state, a physical quantity obtained by summing up a physical quantity corresponding to a facing area between the first fixed electrode 11 and the first movable electrode 21 in the detection part Z1 and a physical quantity corresponding to a facing area between the second fixed electrode 51 and the second movable electrode 61 in the detection part Z2 is a physical quantity in the initial state. Examples of the physical quantity include a static capacitance.

Next, an operation in a state where an acceleration in the third direction DR3 occurs as illustrated in a center column of FIG. 4 will be described. In the state where the acceleration in the third direction DR3 occurs, the second movable electrode 61 receives an inertial force in a direction opposite to the direction of the acceleration in the detection part Z2. Therefore, the second movable electrode 61 in the detection part Z2 is displaced to the fifth direction DR5 side, that is, in a −Z direction, and the first movable electrode 21 in the detection part Z1 is displaced in a +Z direction opposite to the second movable electrode 61. Accordingly, in the detection part Z2, the facing area between the second fixed electrode 51 and the second movable electrode 61 is maintained, and in the detection part Z1, the facing area between the first fixed electrode 11 and the first movable electrode 21 decreases. Accordingly, a physical quantity in the third direction DR3 can be detected by detecting a change in the physical quantity caused by a decrease in the facing area in the detection part Z1.

On the other hand, as illustrated in a right column of FIG. 4, in a state where an acceleration in the fifth direction DR5 occurs from the initial state, the second movable electrode 61 receives an inertial force in the third direction DR3. Therefore, in the detection part Z2, the second movable electrode 61 is displaced in the third direction DR3, and the first movable electrode 21 in the detection part Z1 is displaced in the fifth direction DR5, which is the opposite direction of the third direction DR3. Accordingly, the facing area between the second fixed electrode 51 and the second movable electrode 61 decreases in the detection part Z2, and the facing area between the first fixed electrode 11 and the first movable electrode 21 is maintained in the detection part Z1. Accordingly, a physical quantity in the fifth direction DR5 can be detected by detecting a change in the physical quantity caused by a decrease in the facing area in the detection part Z2. When a change in the static capacitance serving as a physical quantity is to be detected, for example, the static capacitance can be detected by coupling the first fixed electrode 11, the second fixed electrode 51, the first movable electrode 21, and the second movable electrode 61 to a differential amplifier circuit (not shown) via a wiring and a pad. Here, when the acceleration in the third direction DR3 or the fifth direction DR5 occurs, the second movable electrode 61 in the detection part Z2 is displaced in a direction opposite to the direction of the acceleration. This is because the movable body MB provided at the fourth direction DR4 side, that is, the movable body MB on a detection part Z2 side is heavier than the movable body MB provided on the first direction DR1 side, that is, the movable body MB on a detection part Z1 side.

In the embodiment, the thickness of the first movable electrode 21 of the first movable electrode portion 20A in the third direction DR3 is larger than the thickness of the first fixed electrode 11 of the first fixed electrode portion 10A in the third direction DR3, and the thickness of the second movable electrode 61 of the second movable electrode portion 60A in the third direction DR3 is larger than the thickness of the second fixed electrode 51 of the second fixed electrode portion 50A in the third direction DR3.

In this way, when the acceleration in the third direction DR3 occurs, the facing area between the first fixed electrode 11 and the first movable electrode 21 decreases in the detection part Z1, and the facing area between the second fixed electrode 51 and the second movable electrode 61 is maintained in the detection part Z2, and thus a change in the physical quantity in the third direction DR3 can be detected. In addition, when the acceleration in the fifth direction DR5 occurs, the facing area between the second fixed electrode 51 and the second movable electrode 61 decreases in the detection part Z2, and the facing area between the first fixed electrode 11 and the first movable electrode 21 is maintained in the detection part Z1, and thus a change in the physical quantity in the fifth direction DR5 can be detected.

Figure 5:
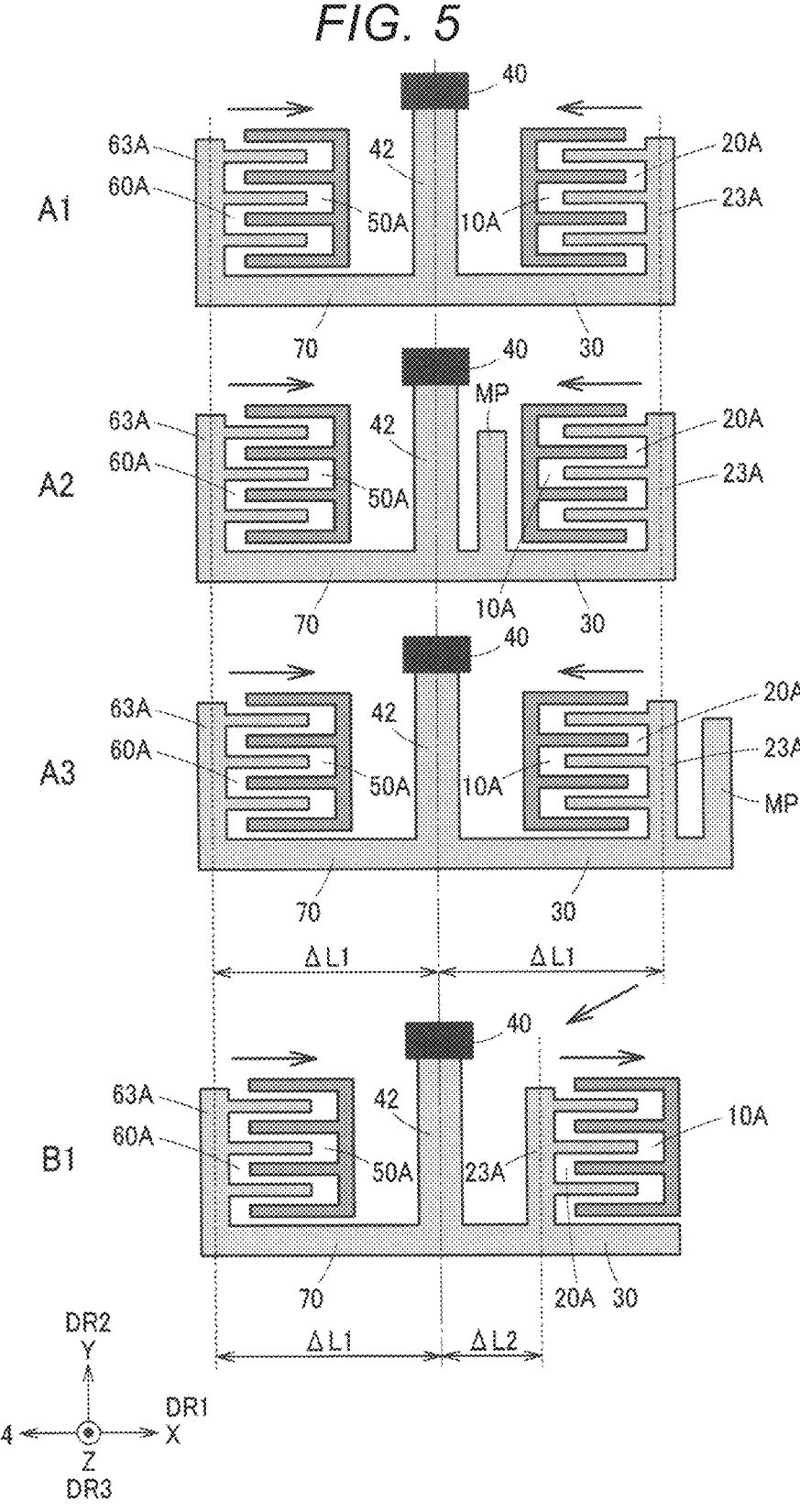
FIG. 5 is a schematic diagram in which a planar shape of a movable body of the embodiment is compared with those in examples in the related art.

FIG. 5 is a schematic diagram illustrating a shape of the movable body MB in the physical quantity sensor 1 according to the embodiment in comparison with shapes of the movable body in comparative examples. Specifically, a positional relationship in a plan view of the support beam 42, the first base portion 23A, the first movable electrode portion 20A, the second base portion 63A, the second movable electrode portion 60A, and the like and an extending direction of each probe electrode in the embodiment are different from those in the comparative examples. Configurations indicated by A1, A2, and A3 in FIG. 5 are configurations of the movable body of the physical quantity sensor 1 according to the comparative examples, and a configuration indicated by B1 is the configuration of the movable body MB according to the embodiment.

Figure 6:
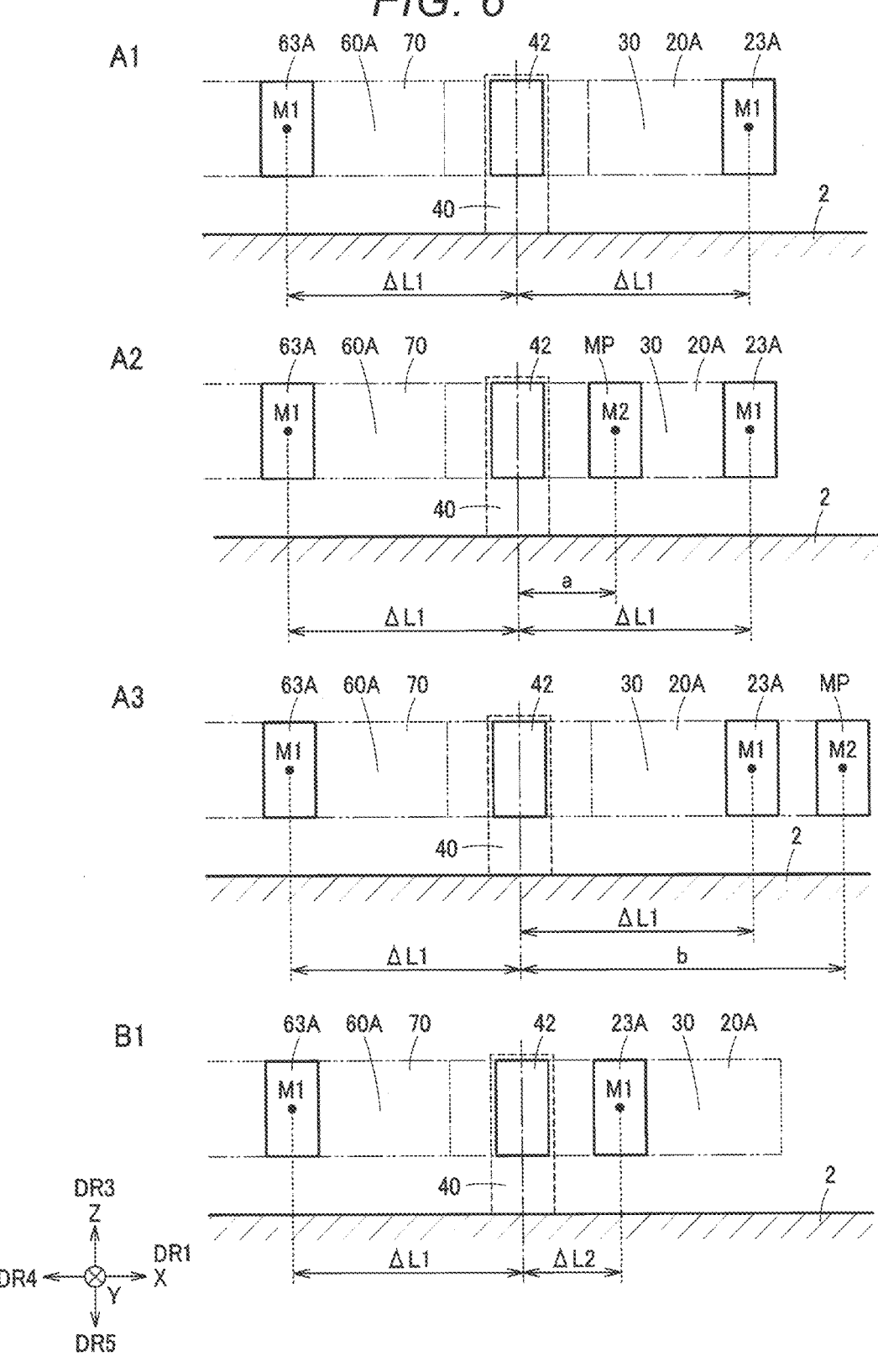
FIG. 6 is a schematic diagram in which a cross-sectional shape of the movable body of the embodiment is compared with those of the examples in the related art.

A method of detecting a physical quantity by the physical quantity sensor 1 is described with reference to FIG. 4. Further, a rotational sensitivity with respect to acceleration of the movable body MB will be studied specifically. FIG. 6 schematically illustrates rotational physical systems corresponding to the configurations indicated by A1 to A3 and B1 in FIG. 5. In the configuration example indicated by A1 in FIG. 6, the first base portion 23A having a mass M1 is provided at a position separated from the support beam 42 by AL1 in the first direction DR1, and the second base portion 63A having the same mass M1 is provided at a position separated from the support beam 42 by AL1 in the fourth direction DR4. When an inertial moment on the first direction DR1 side of the support beam 42 of the movable body MB is defined as $I_{Z1}$ and an inertial moment on the fourth direction DR4 side of the support beam 42 is defined as $I_{Z2}$, both the inertial moments $I_{Z1}$ and $I_{Z2}$ are $M1 \times \Delta L1^2$ and equal to each other. Here, for example, when an acceleration in the third direction DR3 occurs, the first base portion 23A and the second base portion 63A receive an inertial force FI in a direction opposite to the third direction DR3. However, the inertial forces FI received by the first base portion 23A and the second base portion 63A act in such directions that torques cancel each other out in the rotational physical system including the support beam 42. A difference between the inertial moment $I_{Z1}$ on the first direction DR1 side of the support beam 42 and the inertial moment $I_{Z2}$ on the fourth direction DR4 side of the support beam 42 is obtained and is considered to be a net inertial moment I of the entire movable body MB. That is, $I_{Z1}-I_{Z2}$, which is the net inertial moment, is an index indicating the rotational sensitivity of the entire movable body MB.

In the configuration example indicated by A1 in FIG. 5, since $I_{Z1}-I_{Z2}$, which is the net inertial moment, is zero, even if an inertial force along the third direction DR3 is generated in the movable body MB that performs the swing movement with the support beam 42 as a rotation axis, the entire movable body MB cannot move. The first movable electrode portion 20A and the first coupling portion 30 are provided at the first direction DR1 side of the support beam 42, and the second movable electrode portion 60A and the second coupling portion 70 are provided at the fourth direction DR4 side of the support beam 42. It is considered that these portions are provided symmetrically with respect to the rotation axis.

As described above, in the configuration example indicated by A1 in FIG. 5, there is a problem that the net inertial moment I is zero and the movable body MB as a whole cannot move. Therefore, in order to solve such a problem, configuration examples as indicated by A2 and A3 in FIG. 5 are conceived. In the configuration examples indicated by A2 and A3 in FIG. 5, a mass portion MP is provided on the first direction DR1 side of the support beam 42, and the net inertial moment I is not 0. In the configuration example indicated by A2 in FIG. 5, as indicated by A2 in FIG. 6, the mass portion MP is provided at a position with a distance a from the rotation axis, and $I_{Z1}=M1 \times \Delta L1^2+M2 \times a^2$. Therefore, the net inertial moment I is $M2 \times a^2$. Further, in the configuration example indicated by A3 in FIG. 5, as indicated by A3 in FIG. 6, the mass portion MP is provided at a position with a distance b from the rotation axis, $I_{Z1}=M1 \times \Delta L1^2+M2 \times b^2$, and the net inertial moment I is $M2 \times b^2$. As described above, in any of the configurations A2 and A3 obtained by improving the configuration example of A1 in FIG. 5, the net inertial moment I is not zero, and the movable body MB can swing at a fixed rotational sensitivity. However, in these configurations, the first base portion 23A and the second base portion 63A are provided at both sides of the rotation axis and the masses M1 thereof are cancelled by each other, and thus the masses of the first base portion 23A and the second base portion 63A do not substantially contribute to the rotational sensitivity of the movable body MB. That is, by providing the mass portion MP in addition to the first base portion 23A and the second base portion 63A, the rotational sensitivity is provided to the movable body MB for the first time.

In such configurations, since the mass portion MP is actually provided, the net inertial moment I is not 0. However, since the first base portion 23A and the second base portion 63A, which are existing components, cannot contribute to the net inertial moment I, efficiency of obtaining the rotational sensitivity of the movable body MB is reduced. The inertial moment I is proportional to a mass m and the square of a distance r from the rotation axis. Therefore, in the configuration indicated by A2 in FIG. 5 in which the mass portion MP located close to the rotation axis at the distance a contributes to the net inertial moment I, a sufficient rotational sensitivity of the movable body MB cannot be obtained unless a mass M2 of the mass portion MP is increased to such an extent that a magnitude of the distance from the rotation axis is cancelled.

On the other hand, in the configuration indicated by A3 in FIG. 5, the mass portion MP is provided at an outer side of the first base portion 23A, and the distance b from the rotation axis can be set to a certain magnitude. Accordingly, the problem in the configuration example indicated by A2 in FIG. 5 does not occur. However, in the configuration example indicated by A3 in FIG. 5, since the mass portion MP is provided at an outer side of the movable body MB, an extra space is required, and it is not desirable from the viewpoint of reduction in size of the physical quantity sensor 1. In addition, in the configuration disclosed in JP-A-2021-032819, masses are non-symmetrical with respect to the rotation axis, but from the viewpoint of increasing sensitivity, non-symmetrical arrangement of the mass is not always optimal. Since the comb teeth-shaped probe electrodes are not symmetrically arranged with respect to the rotation axis, there is a problem that the linearity of the positive and negative detection characteristics is deteriorated. In the configurations indicated by A1 to A3 in FIG. 5 as described above, as shown by arrows in the drawing, the probe electrodes are provided so as to be oriented in the opposite direction with respect to the rotation axis, and it is difficult to make the first base portion 23A and the second base portion 63A, which are existing components, contribute to the net inertial moment I.

In this regard, in the embodiment indicated by B1 in FIG. 5, the extending directions of the probe electrodes coincide with each other on both sides of the rotation axis, and the positional relationship between the existing first base portion 23A and second base portion 63A with respect to the rotation axis is changed to be non-symmetrical, so that the net inertial moment I can be generated. Therefore, the net inertial moment I can be generated without separately providing the mass portion MP. Specifically, as described with reference to FIG. 2, the first movable electrode portion 20A and the second movable electrode portion 60A are provided at symmetrical positions with respect to the support beam 42 serving as the rotation axis, and the first base portion 23A and the second base portion 63A are disposed such that the extending directions of the first movable electrode 21 and the second movable electrode 61 are the same. In the embodiment, the inertial moment $I_{Z1}$ on the first direction DR1 side of the rotation axis is $I_{Z1}=M1\times\Delta L2^2$, and the inertial moment $I_{Z2}$ on the fourth direction DR4 side is $I_{Z2}=M1\times\Delta L1^2$. Accordingly, the net inertial moment I is expressed by formula (1).

$$I=M1(\Delta L1^2-\Delta L2^2) \tag{1}$$

In the configuration example indicated by A2 in FIG. 5, the distance a from the rotation axis to the mass portion MP is short, and the net inertial moment I is not sufficiently obtained, whereas in the embodiment, as shown in formula (1), the net inertial moment I increases as the distance $\Delta L2$ from the rotation axis to the first base portion 23A on the first direction DR1 side decreases. As described, by changing the arrangement of the existing first base portion 23A and the existing second base portion 63A, the net inertial moment I can be efficiently obtained, and the rotational sensitivity of the movable body MB can be obtained. In addition, it is possible to gain the net inertial moment I without newly providing the mass portion MP, and the problem of volume increase of the physical quantity sensor 1 caused by addition of the mass portion MP is relatively unlikely to occur.

That is, the physical quantity sensor 1 of the embodiment is a physical quantity sensor that detects, when three directions orthogonal to one another are defined as the first direction DR1, the second direction DR2, and the third direction DR3, a physical quantity in the third direction DR3. The physical quantity sensor 1 of the embodiment includes the fixed portion 40, the support beam 42, the movable body MB, the first fixed electrode portion and the second fixed electrode portion 50A. The fixed portion 40 is fixed at the substrate 2. The support beam 42 has the one end coupled to the fixed portion 40 and is provided along the second direction DR2. The movable body MB is coupled to the other end of the support beam 42. The first fixed electrode portion 10A and the second fixed electrode portion 50A are provided at the substrate 2. The movable body MB includes the first coupling portion 30, the first base portion 23A, the first movable electrode portion the second coupling portion 70, the second base portion 63A, and the second movable electrode portion 60A. The first coupling portion 30 is coupled to the other end of the support beam 42 and extends from the support beam 42 in the first direction DR1. The first base portion 23A is coupled to the first coupling portion 30 and is provided along the second direction DR2. The first movable electrode 21 of the first movable electrode portion 20A extends from the first base portion 23A in the first direction DR1 and faces the first fixed electrode 11 of the first fixed electrode portion 10A in the second direction DR2. The second coupling portion 70 is coupled to the other end of the support beam 42 and extends from the support beam 42 in the fourth direction DR4 opposite to the first direction DR1. The second base portion 63A is coupled to the second coupling portion 70 and is provided along the second direction DR2. The second movable electrode 61 of the second movable electrode portion 60A extends from the second base portion 63A in the first direction DR1 and faces the second fixed electrode 51 of the second fixed electrode portion 50A in the second direction DR2.

In this way, by extending the first movable electrode 21 and the second movable electrode 61 in the same direction with respect to the support beam 42 that is the rotation axis, the detection part Z1 is disposed on a side far from the rotation axis with respect to the first base portion 23A, and the detection part Z2 is disposed on a side close to the rotation axis with respect to the second base portion 63A. Accordingly, it is easy to dispose the second base portion 63A at a position farther from the rotation axis than is the first base portion 23A. Accordingly, the inertial moment I can be efficiently obtained, and a detection sensitivity for a physical quantity of the physical quantity sensor 1 can be increased.

As described above, in the embodiment, for example, a spring length direction of the support beam 42 is the second direction DR2, and a comb tooth length direction of the probe electrode is the first direction DR1, and the spring length direction of the support beam 42 and the comb tooth length direction of the probe electrode are orthogonal to each other. In a plan view, when the probe electrodes located on both sides of the support beam 42 serving as the rotation axis with the same distance from a center of an area where the probe electrodes are provided to the rotation axis are compared with each other, a direction from a base portion to a tip end portion of the movable probe electrode is the same in at least one area. With such a configuration, in the physical quantity sensor 1 according to the embodiment, the probe electrodes are provided at both sides of the support beam 42 serving as the rotation axis in the plan view, and the shape and mass of the movable body MB are non-symmetrical. Accordingly, a high sensitivity and reduction in size of the physical quantity sensor 1 can be achieved.

In addition, in the embodiment, for example, when the thicknesses of the first movable electrode 21 and the second movable electrode 61 in the third direction DR3 in FIG. 3 are reduced, a static capacitance in the initial state can be reduced, and there is also an advantage of improving an SN ratio of an output voltage.

That is, in the embodiment, the first movable electrode portion 20A and the second movable electrode portion 60A are provided at symmetrical positions in the first direction DR1 with respect to the support beam 42.

In this way, since the detection parts are arranged symmetrically with respect to the rotation axis, it is possible to implement the physical quantity sensor 1 excellent in linearity of the positive and negative detection characteristics.

2. Detailed Configuration Examples

Figure 7:
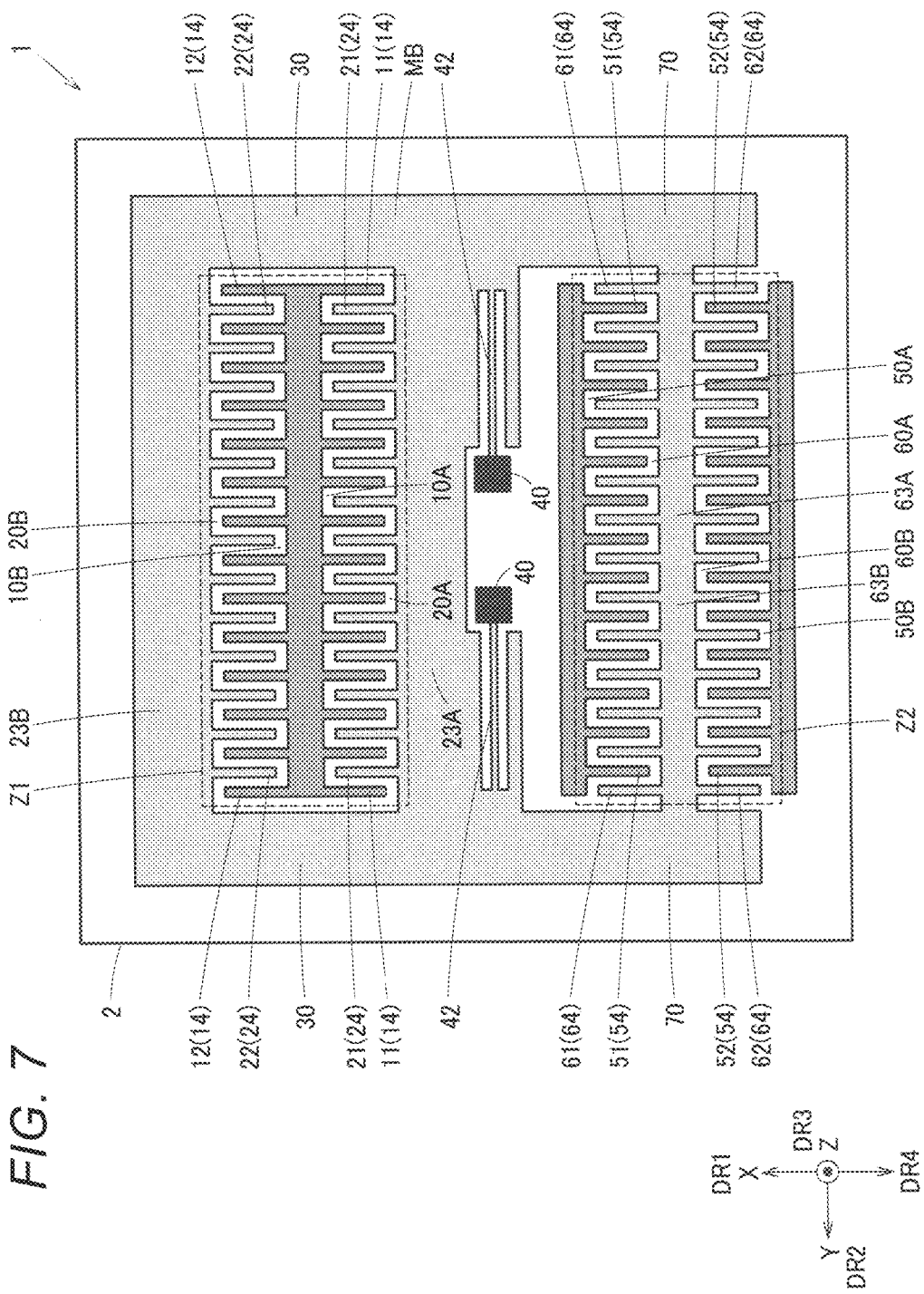
FIG. 7 is a plan view of a first detailed example.

FIG. 7 is a plan view of a first detailed example of the embodiment. Similarly to the configuration example illustrated in FIG. 1, the first detailed example is a physical quantity sensor 1 having an area-changing structure in which area changes due to out-of-plane rotation, but the first detailed example is different from the configuration example 1 illustrated in FIG. 1 in a shape of the entire movable body MB and a configuration of the probe electrodes. In the first detailed example, the movable body MB is coupled to the substrate 2 by two fixed portions 40. In the first detailed example, the physical quantity sensor 1 includes a third base portion 23B in addition to the first base portion 23A. The third base portion 23B, together with the first base portion 23A, couples two first coupling portions 30 of the movable body MB in the second direction DR2. As illustrated in FIG. 7, the two first coupling portions 30 of the movable body MB are provided at both sides of the first base portion 23A and the third base portion 23B.

In the first detailed example, the physical quantity sensor 1 includes a third fixed electrode portion 10B and a fourth fixed electrode portion 50B in addition to the first fixed electrode portion 10A and the second fixed electrode portion 50A. The movable body MB of the first detailed example includes a third movable electrode portion 20B and a fourth movable electrode portion 60B in addition to the first movable electrode portion 20A and the second movable electrode portion 60A.

As illustrated in FIG. 7, the third fixed electrode portion 10B is provided side by side with the first fixed electrode portion 10A along the first direction DR1 on a first direction DR1 side of the support beam 42 serving as a rotation axis. The third fixed electrode portion 10B is provided on the first direction DR1 side of the first fixed electrode portion 10A. The third fixed electrode portion 10B includes third fixed electrodes 12 having a comb tooth shape, and the third fixed electrode 12 extends from a base portion common to the first fixed electrode 11 in the first direction DR1 that is opposite to that of the first fixed electrode 11.

The third movable electrode portion 20B is provided side by side with the first movable electrode portion 20A along the first direction DR1 on the first direction DR1 side of the support beam 42 serving as the rotation axis. The third movable electrode portion 20B is provided on the first direction DR1 side of the first movable electrode portion 20A. The third movable electrode portion 20B includes third movable electrodes 22 having a comb tooth shape, and the third movable electrode 22 extends from the third base portion 23B in the fourth direction DR4. In the detection part Z1, the third movable electrodes 22 are alternately provided with the third fixed electrodes 12 facing the third fixed electrodes 12 in the second direction DR2.

The fourth fixed electrode portion 50B is provided side by side with the second fixed electrode portion 50A along the first direction DR1 on a fourth direction DR4 side of the rotation axis. The fourth fixed electrode portion 50B is provided on the fourth direction DR4 side of the second fixed electrode portion 50A. The fourth fixed electrode portion 50B includes fourth fixed electrodes 52 having a comb tooth shape, and the fourth fixed electrode 52 extends from a base portion of the fourth fixed electrode portion 50B in the first direction DR1.

The fourth movable electrode portion 60B is provided side by side with the second movable electrode portion 60A along the first direction DR1 on the fourth direction DR4 side of the rotation axis. The fourth movable electrode portion 60B is provided on the fourth direction DR4 side of the second movable electrode portion 60A. The fourth movable electrode portion 60B includes fourth movable electrodes 62 having a comb tooth shape, and the fourth movable electrode 62 extends from a fourth base portion 63B in the fourth direction DR4 that is opposite to that of the second movable electrode 61. In the detection part Z2, the fourth movable electrodes 62 are alternately provided with the fourth fixed electrodes 52 facing the fourth fixed electrodes 52 in the second direction DR2. Here, the fourth base portion 63B is integrated with the above-described second base portion 63A. That is, the second base portion 63A and the fourth base portion 63B are integrated, the second movable electrode 61 extends to the first direction DR1 side of the integrated portion, and the fourth movable electrode 62 extends to the fourth direction DR4 side of the integrated portion. The fourth base portion 63B may be separated from the second base portion 63A.

As described above, in the first detailed example, an area in which the first fixed electrodes 11 and the first movable electrodes 21 are provided in a manner of facing each other, and an area in which the third fixed electrodes 12 and the third movable electrodes 22 are provided in a manner of facing each other, are arranged side by side in two rows on the first direction DR1 side of the support beam 42 serving as the rotation axis. In the following description, as appropriate, the first fixed electrodes 11 and the third fixed electrodes 12 are collectively referred to as fixed electrodes 14 without being distinguished from each other, and the first movable electrodes 21 and the third movable electrodes 22 are collectively referred to as movable electrodes 24 without being distinguished from each other. In addition, the second fixed electrodes 51 and the fourth fixed electrodes 52 are collectively referred to as fixed electrodes 54 without being distinguished from each other, and the second movable electrodes 61 and the fourth movable electrodes 62 are collectively referred to as movable electrodes 64 without being distinguished from each other. Further, as illustrated in FIG. 7, the first base portion 23A may be configured to fill a space between the support beam 42 as well as the fixed portion 40 and the first movable electrode portion 20A. Further, as illustrated in FIG. 7, a protective portion that protects the support beam 42 may be disposed on the fourth direction DR4 side of the support beam 42 and the fixed portion 40. Further, as illustrated in FIG. 7, each of the first base portion 23A and the third base portion 23B may be configured to be wider than the second base portion 63A and the fourth base portion 63B that are integrated.

Figure 8:
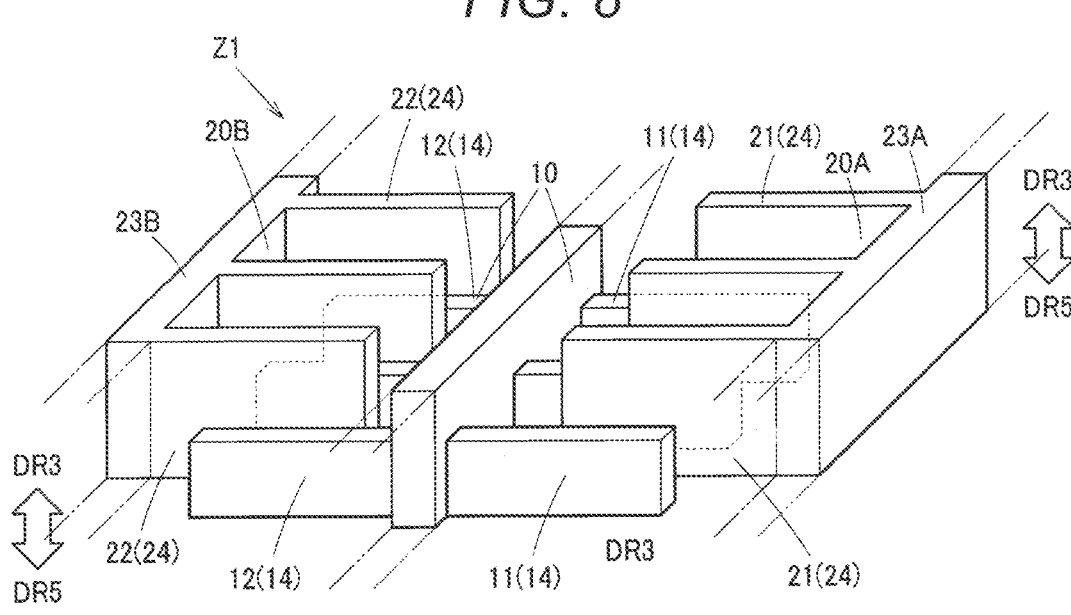
FIG. 8 is a perspective view of a detection part of the first detailed example.
Figure 8:
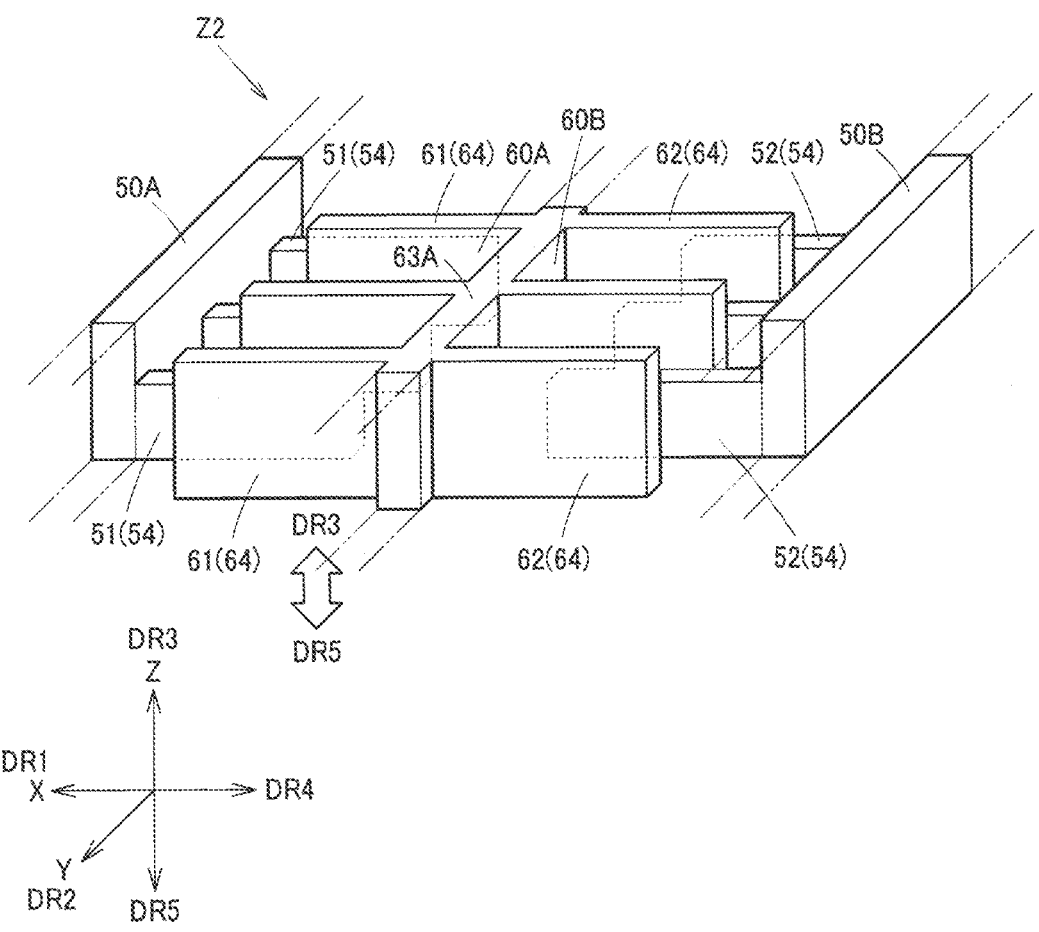

FIG. 8 is a diagram illustrating a configuration of the probe electrodes in each detection part according to the first detailed example. An upper part of FIG. 8 illustrates the configuration of the probe electrodes in the detection part Z1. In the first detailed example, the first fixed electrode portion 10A and the third fixed electrode portion 10B are adjacent to the first movable electrode portion 20A on the fourth direction DR4 side, and adjacent to the third movable electrode portion 20B on the first direction DR1 side. That is, the first fixed electrode portion 10A and the third fixed electrode portion 10B are surrounded by the first movable electrode portion 20A and the third movable electrode portion 20B. Similarly to the configuration example in FIG. 1, a thickness of each of the first movable electrode 21 and the third movable electrode 22 in the third direction DR3 is larger than a thickness of each of the first fixed electrode 11 and the third fixed electrode 12.

A lower part of FIG. 8 illustrates the configuration of the probe electrodes in the detection part Z2. In the detection part Z2, the second fixed electrode portion 50A is adjacent to the second movable electrode portion 60A on the fourth direction DR4 side, and the fourth fixed electrode portion 50B is adjacent to the fourth movable electrode portion 60B on the first direction DR1 side. Similarly to the configuration example in FIG. 1, a thickness of each of the second movable electrode 61 and the fourth movable electrode 62 in the third direction DR3 is larger than a thickness of each of the second fixed electrode 51 and the fourth fixed electrode 52.

In the first detailed example, when an acceleration in the third direction DR3 or the fifth direction DR5 occurs, the first movable electrode 21 and the third movable electrode 22 in the detection part Z1 are displaced in a direction opposite to the direction of the acceleration. This is because the movable body MB provided on the first direction DR1 side, that is, the movable body MB on a detection part Z1 side is heavier than the movable body MB provided on the fourth direction DR4 side, that is, the movable body MB on a detection part Z2 side. Accordingly, regarding operations of the detection parts Z1 and Z2 in the first detailed example, moving directions of the first movable electrode 21 and the second movable electrode 61 are opposite to those illustrated in an operation principle described with reference to FIG. 4. Therefore, when the acceleration in the third direction DR3 occurs, a decrease in the facing area between the probe electrodes occurs in the detection part Z2 but not in the detection part Z1. In addition, when the acceleration in the fifth direction DR5 occurs, a decrease in the facing area between the probe electrodes occurs in the detection part Z1 but not in the detection part Z2. As described above, in the first detailed example, two rows of areas, in which the probe electrodes are provided, are arranged on a side close to the rotation axis and a side far from the rotation axis, and thus a larger change in the facing area is detected. In addition, in a case where the movable body is displaced in the first direction DR1 or the fourth direction DR4 when an acceleration in the first direction DR1 or the fourth direction DR4 that is a longitudinal direction of the movable electrode 24 and the movable electrode 64 occurs, it is possible to cancel the change in the facing areas in the detection parts Z1 and Z2, and thus it is possible to improve the detection accuracy. The number of rows of the probe electrodes is not limited to two. The same effect can be obtained as long as an even number of rows of the probe electrodes are provided.

In the following description, an operation and effect of a configuration, as represented by the first detailed example, in which two or more rows of areas of the probe electrodes are provided on both sides of the rotation axis will be examined. The configuration example illustrated in FIG. 1 is the most basic configuration example in which one row of area of the probe electrodes is provided on each of both sides of the support beam 42 serving as the rotation axis. However, in an actual application example of the embodiment, a configuration, for example, the first detailed example in which two or more rows of areas of the probe electrodes are provided on each of both sides of the rotation axis is often adopted.

Figure 9:
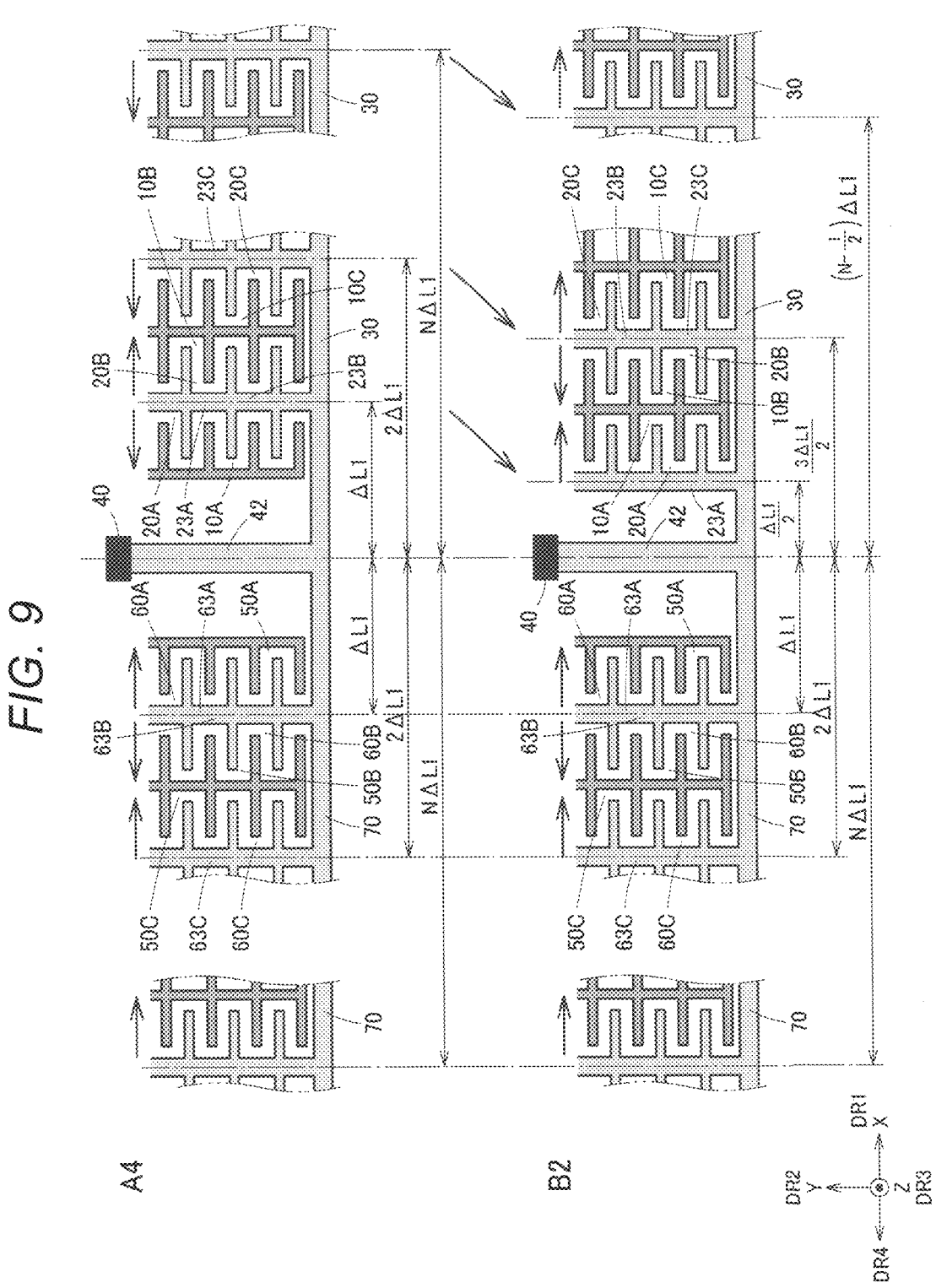
FIG. 9 is a schematic diagram in which a planar shape of a movable body of the first detailed example is compared with that of an example in the related art.

FIG. 9 is a schematic diagram illustrating a shape of the movable body MB in a plan view when a configuration example represented by the first detailed example is generalized and two or more rows of areas of the probe electrodes are provided on each of both sides of the rotation axis. A configuration indicated by A4 in FIG. 9 corresponds to the configuration indicated by A1 in FIG. 5, and a shape of the movable body MB is symmetrical with respect to the support beam 42 serving as the rotation axis. In this case, the first base portion 23A, the third base portion 23B, . . . located on the first direction DR1 side of the rotation axis are provided at positions separated from the rotation axis by distances of ΔL1, 2×ΔL1, . . . , N×ΔL1, respectively. Here, N is a natural number of 3 or more. Similarly, the second base portion 63A, the fourth base portion 63B, . . . located on the fourth direction DR4 side of the rotation axis are provided at positions separated from the rotation axis by distances of ΔL1, 2×ΔL1, . . . , N×ΔL1, respectively. Therefore, in the configuration indicated by A4 in FIG. 9, the inertial moment $I_{Z1}$ of a portion on the first direction DR1 side of the rotation axis of the movable body MB and the inertial moment $I_{Z2}$ on the fourth direction DR4 side of the rotation axis are expressed by formula (2).

$$I_{Z1} = I_{Z2} = M1\Delta L1^2 \sum_N N^2 \tag{2}$$

Therefore, in the configuration indicated by A4 in FIG. 9, the net inertial moment I of the movable body MB is zero due to the cancellation of $I_{Z1}$ and $I_{Z2}$, and even an acceleration occurs, the entire movable body MB cannot swing around the rotation axis. As described above with reference to FIG. 5, the first movable electrode portion 20A, the third movable electrode portion 20B, and the first coupling portion 30 are provided symmetrically with the second movable electrode portion 60A, the fourth movable electrode portion 60B, . . . and the second coupling portion 70 with respect to the rotation axis, and influence thereof may not be considered in formula (2).

On the other hand, a configuration indicated by B2 in FIG. 9 corresponds to the configuration indicated by B1 in FIG. 5, and a shape of the movable body is non-symmetrical with respect to the support beam 42 serving as the rotation axis. As illustrated in FIG. 9, on the fourth direction DR4 side of the rotation axis, the second base portion 63A, the fourth base portion 63B, . . . are provided at positions separated from the rotation axis by the same distances in the configuration indicated by A4 and the configuration indicated by B2. However, on the first direction DR1 side of the rotation axis, as indicated by an arrow, the first base portion 23A, the third base portion 23B, . . . in the configuration indicated by B2 are provided at positions shifted by ΔL1/2 toward the fourth direction DR4 side from the first base portion 23A and the like in the configuration indicated by A4. First, the inertial moment $I_{Z1}$ of a portion on the first direction DR1 side of the rotation axis of the movable body MB is expressed by formula (3).

$$I_{Z1} = M1\Delta L1^2 \sum_N \left(N - \frac{1}{2}\right)^2 \tag{3}$$

The inertial moment $I_{Z2}$ of the movable body MB on the fourth direction DR4 side of the rotation axis is the same as the right part of formula (2) since there is no change in an arrangement position of the second base portion 63A between A4 and B2 in FIG. 9. Accordingly, the net inertial moment I of the entire movable body MB in the configuration indicated by B2 in FIG. 9 is obtained as in formula (4) when N corresponding to the number of base portions is equal on both sides of the rotation axis. Here, the inertial moment $I_{Z2}$ of the movable body MB on the fourth direction DR4 side of the rotation axis is larger than the inertial moment $I_{Z1}$ of the movable body MB on the first direction DR1 side of the rotation axis.

$$I = I_{Z1} - I_{Z2} = M1\Delta L1^2 \sum_N \left(-N + \frac{1}{4}\right) \tag{4}$$

When N corresponding to the number of base portions on the first direction DR1 side of the rotation axis is larger by one than the number of base portions on the fourth direction DR4 side of the rotation axis, the net inertial moment I is obtained as in formula (5).

$$I = I_{Z1} - I_{Z2} = M1 \Delta L1^2 \sum_N \left(N - \frac{3}{4}\right) \tag{5}$$

From formula (4) or formula (5), in the configuration indicated by B2 in FIG. 9, if the masses M1 of the first base portion 23A, the second base portion 63A, the third base portion 23B, the fourth base portion 63B, . . . are the same and the intervals ΔL1 thereof are the same, an absolute value of the net inertial moment I of the movable body MB can be increased as N is increased, and the rotational sensitivity of the movable body MB can be improved. That is, when more areas of the probe electrode are repeated on both sides of the support beam 42 serving as the rotation axis, the detection sensitivity for a physical quantity of the physical quantity sensor 1 can be improved.

When the first detailed example is supplemented, since a longitudinal direction of the movable body MB coincides with a direction of the support beam 42 serving as the rotation axis, it is possible to separate a resonance frequency in a swing mode of in-plane rotation of the substrate 2 from a resonance frequency in a detection mode, and it is possible to detect the physical quantity with high accuracy. That is, unnecessary sensitivity in other axial directions in the longitudinal direction of the probe electrode can be improved. Further, a longitudinal direction of the support beam 42 and a longitudinal direction of the probe electrodes are orthogonal to each other. Since a length of each probe electrode is not increased, impact resistance and sticking of the probe electrodes are improved. Since the detection parts Z1 and Z2 are arranged symmetrically with respect to the rotation axis, the linearity of the positive and negative detection characteristics is excellent. In the detection parts Z1 and Z2 disposed on both sides of the rotation axis, when the probe electrodes at the same distance from the rotation axis to a center of the area where the probe electrodes face each other are compared, a direction from a base portion to a tip end portion of the movable probe electrode is the same in each area. Therefore, since the shape of the movable body MB can be made non-symmetrical with respect to the support beam 42 serving as the rotation axis, the detection sensitivity for the physical quantity can be increased by efficiently increasing the torque, which contributes to reduction in size. Further, the thickness of each component of the movable body MB in the third direction DR3 can be freely designed, and when all of the coupling portions 30 and 70, the movable electrode portions 20A, 20B, 60A, and 60B, and the support beam 42 have the same thickness, the sensitivity of the probe electrode in other axial directions in the comb tooth length direction can be improved.

In the embodiment, the physical quantity sensor 1 includes the third fixed electrode portion 10B and the fourth fixed electrode portion 50B provided at the substrate 2. The movable body MB includes the third base portion 23B, the third movable electrode portion 20B, the fourth base portion 63B, and the fourth movable electrode portion 60B. The third base portion 23B is coupled to the first coupling portion 30 and is provided along the second direction DR2. The third movable electrode 22 of the third movable electrode portion 20B extends from the third base portion 23B in the fourth direction DR4 and faces the third fixed electrode 12 of the third fixed electrode portion 10B in the second direction DR2. The fourth base portion 63B is coupled to the second coupling portion 70 and is provided along the second direction DR2. The fourth movable electrode 62 of the fourth movable electrode portion 60B extends from the second base portion 63A in the fourth direction DR4 and faces the fourth fixed electrode 52 of the fourth fixed electrode portion 50B in the second direction DR2.

In this way, on the first direction DR1 side of the rotation axis, not only the facing area between the first fixed electrode 11 and the first movable electrode 21 but also the facing area between the third fixed electrode 12 and the third movable electrode 22 is changed in response to the swing movement of the movable body MB accompanying an acceleration. On the fourth direction DR4 side of the rotation axis, not only the facing area between the second fixed electrode 51 and the second movable electrode 61 but also the facing area between the fourth fixed electrode 52 and the fourth movable electrode 62 is changed. Accordingly, it is possible to detect a change in the physical quantity by using more probe electrodes, and it is possible to improve the detection sensitivity of the physical quantity of the physical quantity sensor 1. In addition, the third base portion 23B can be provided at a position farther away from the rotation axis than the first base portion 23A and the second base portion 63A, and a larger inertial moment I of the movable body MB can be obtained, and a high sensitivity of the physical quantity sensor 1 can be achieved.

In the embodiment, the third movable electrode portion 20B and the fourth movable electrode portion 60B are provided at symmetrical positions in the first direction DR1 with respect to the support beam 42.

In this way, the second base portion 63A provided on the fourth direction DR4 side of the support beam 42 serving as the rotation axis can be disposed non-symmetrically to the first base portion 23A and the third base portion 23B with respect to the rotation axis. Therefore, the inertial moment I of the entire movable body MB can be efficiently obtained with a smaller space. Accordingly, it is possible to implement the physical quantity sensor 1 having a small size and a high detection sensitivity. In addition, since the third movable electrode portion 20B and the fourth movable electrode portion 60B are also disposed symmetrically with respect to the rotation axis, it is possible to implement the physical quantity sensor 1 having excellent linearity of positive and negative detection characteristics.

In the embodiment, the thickness of the first movable electrode 21 of the first movable electrode portion 20A in the third direction DR3 is different from the thickness of the first fixed electrode 11 of the first fixed electrode portion 10A in the third direction DR3, and the thickness of the second movable electrode 61 of the second movable electrode portion 60A in the third direction DR3 is different from the thickness of the second fixed electrode 51 of the second fixed electrode portion 50A in the third direction DR3.

In this way, a change in the physical quantity in both the third direction and the fifth direction can be detected. In addition, in a cross-sectional view, the first movable electrode 21 of the first movable electrode portion 20A and the first fixed electrode 11 of the first fixed electrode portion 10A can be disposed such that one of the first movable electrode 21 and the first fixed electrode 11 entirely overlaps a part of the other. Further, the second movable electrode 61 of the second movable electrode portion and the second fixed electrode 51 of the second fixed electrode portion 50A can also be disposed such that one of the second movable electrode 61 and the second fixed electrode 51 entirely overlaps a part of the other.

In the configuration example illustrated in FIG. 1, the thickness of the first movable electrode 21 of the first movable electrode portion 20A in the third direction DR3 is larger than the thickness of the first fixed electrode 11 of the first fixed electrode portion 10A in the third direction DR3, and the thickness of the second movable electrode 61 of the second movable electrode portion 60A in the third direction DR3 is larger than the thickness of the second fixed electrode 51 of the second fixed electrode portion 50A in the third direction DR3.

In this way, in the configuration example illustrated in FIG. 1, the first movable electrode 21 and the first fixed electrode 11 are disposed such that the back surfaces thereof are flush with each other in a cross-sectional view, and thus when the acceleration in the third direction DR3 occurs, the first movable electrode 21 is displaced in the third direction DR3, and accordingly the facing area between the first movable electrode 21 and the first fixed electrode 11 decreases. When the acceleration in the fifth direction DR5 occurs, the first movable electrode 21 is displaced in the fifth direction DR5, and thus the facing area between the first movable electrode 21 and the first fixed electrode 11 is maintained. The second movable electrode 61 and the second fixed electrode 51 are disposed such that the back surfaces thereof are flush with each other, and thus when the acceleration in the third direction DR3 occurs, the second movable electrode 61 is displaced in the fifth direction DR5, and accordingly the facing area between the second movable electrode 61 and the second fixed electrode 51 is maintained. When the acceleration in the fifth direction DR5 occurs, the second movable electrode 61 is displaced in the third direction DR3, and thus the facing area between the second movable electrode 61 and the second fixed electrode 51 decreases. Accordingly, it is possible to detect the physical quantity in both the third direction DR3 and the fifth direction DR5.

Figure 10:
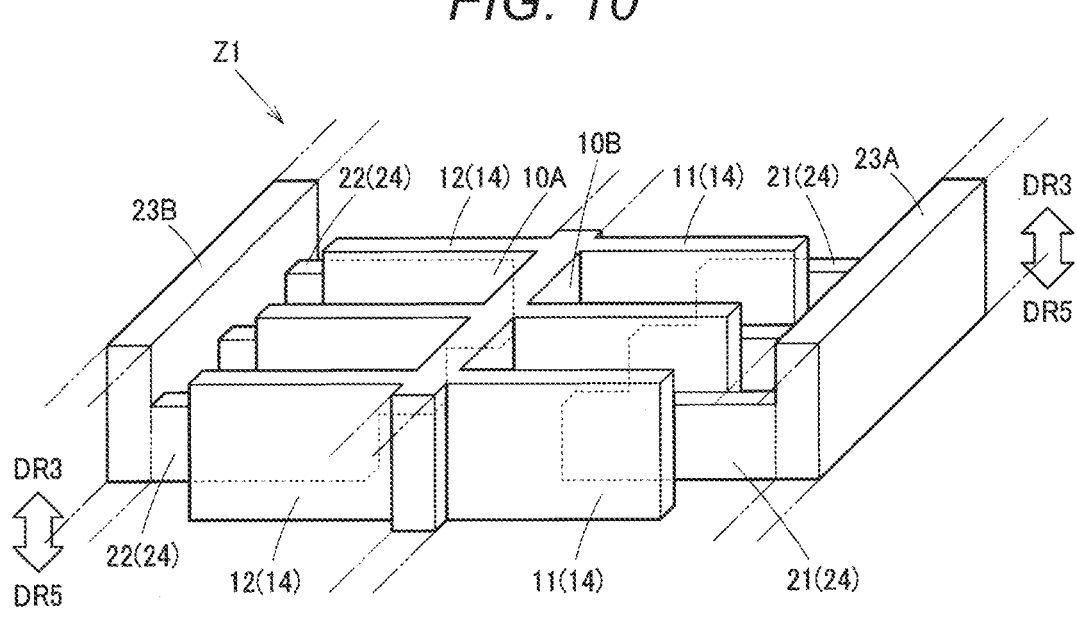
FIG. 10 is a perspective view of a detection part in a modification of the first detailed example.
Figure 10:
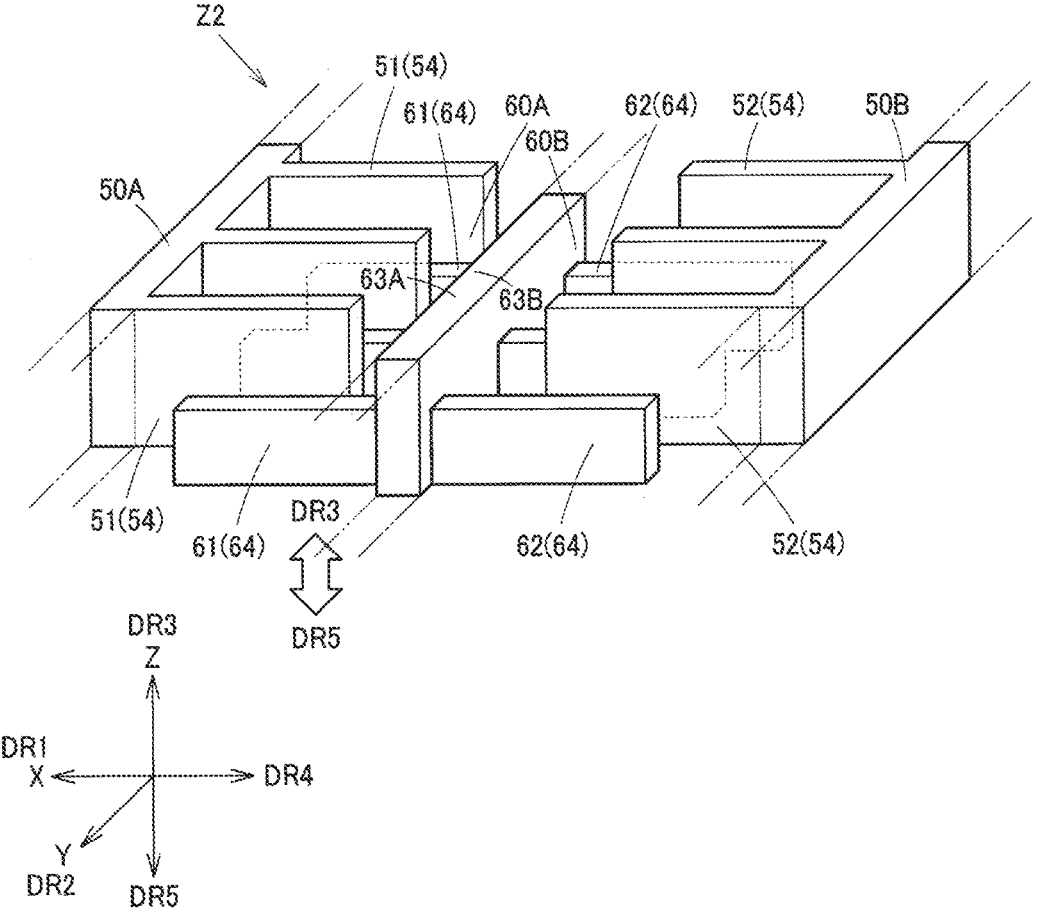

FIG. 10 is a perspective view illustrating a modification of the first detailed example. The modification in FIG. 10 is different from the first detailed example in shapes of the probe electrodes. As compared with the shapes of the probe electrodes of the first detailed example shown in FIG. 8, in the modification in FIG. 10, in the detection part Z1, the thickness of each of the first movable electrode 21 and the third movable electrode 22 in the third direction DR3 is smaller than the thickness of each of the first fixed electrode 11 and the third fixed electrode 12 in the third direction DR3. In the detection part Z2, the thickness of each of the second movable electrode 61 and the fourth movable electrode 62 in the third direction DR3 is smaller than the thickness of each of the second fixed electrode 51 and the fourth fixed electrode 52 in the third direction DR3.

Figure 11:
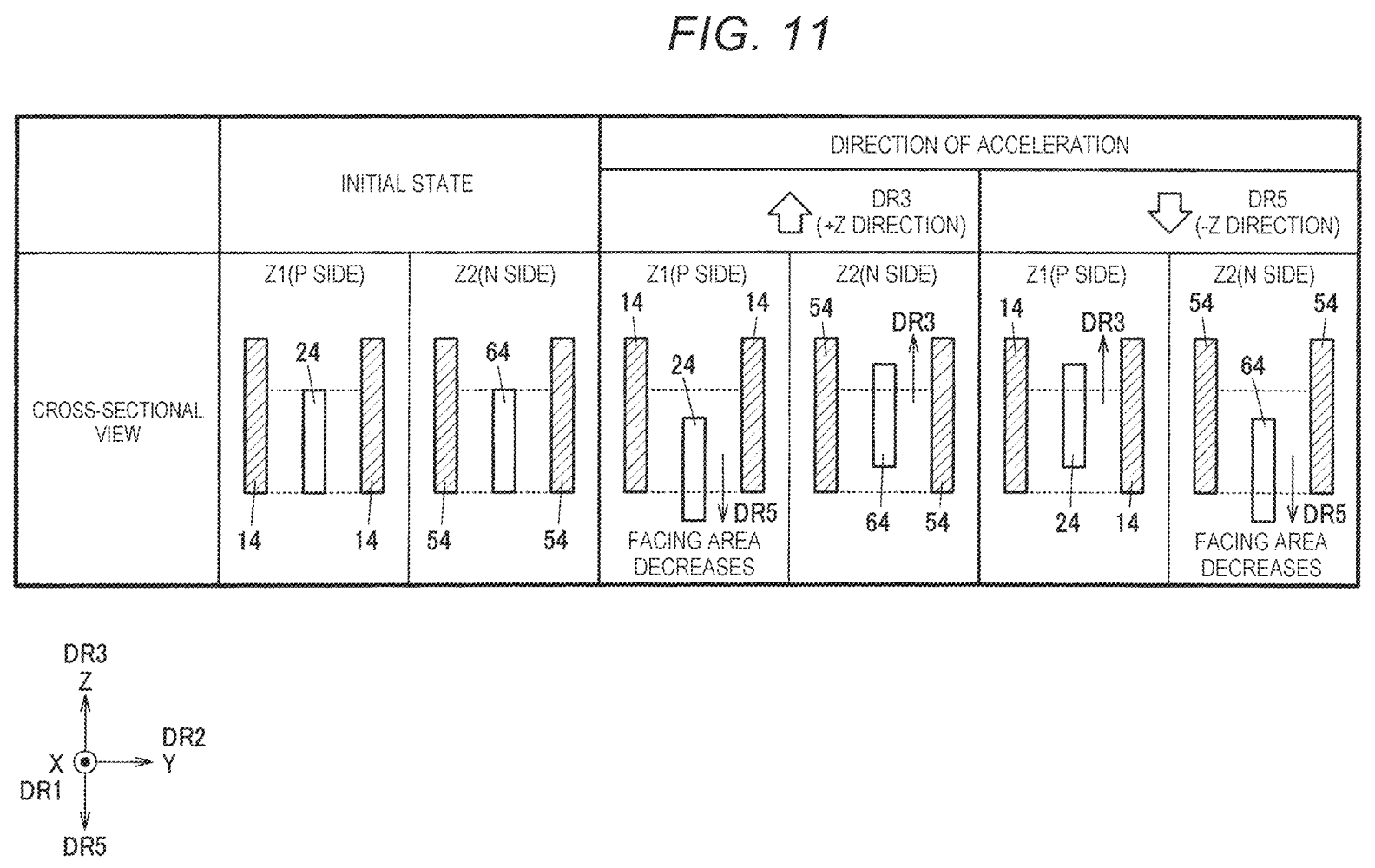

FIG. 11 is a diagram illustrating operations of the detection parts Z1 and Z2 when the modification shown in FIG. 10 is adopted. In the modification example illustrated in FIG. 10, since the third movable electrode 22, the third base portion 23B, and the fourth movable electrode 62 are provided, a relationship between a mass of the detection part Z1 and a mass of the detection part Z2 in the movable body MB is opposite to that in the configuration example illustrated in FIG. 1. Accordingly, regarding the operations of the detection parts Z1 and Z2 in the modification illustrated in FIG. 10, moving directions of the movable electrode 24 and the movable electrode 64 are opposite to those illustrated in the operation principle described with reference to FIG. 4.

Then, as illustrated in FIG. 11, when an acceleration in the third direction DR3 occurs, a decrease in the facing area between the probe electrodes occurs in the detection part Z1. In addition, when an acceleration in the fifth direction DR5 occurs, a decrease in the facing area between the probe electrodes occurs in the detection part Z2.

Figure 12:
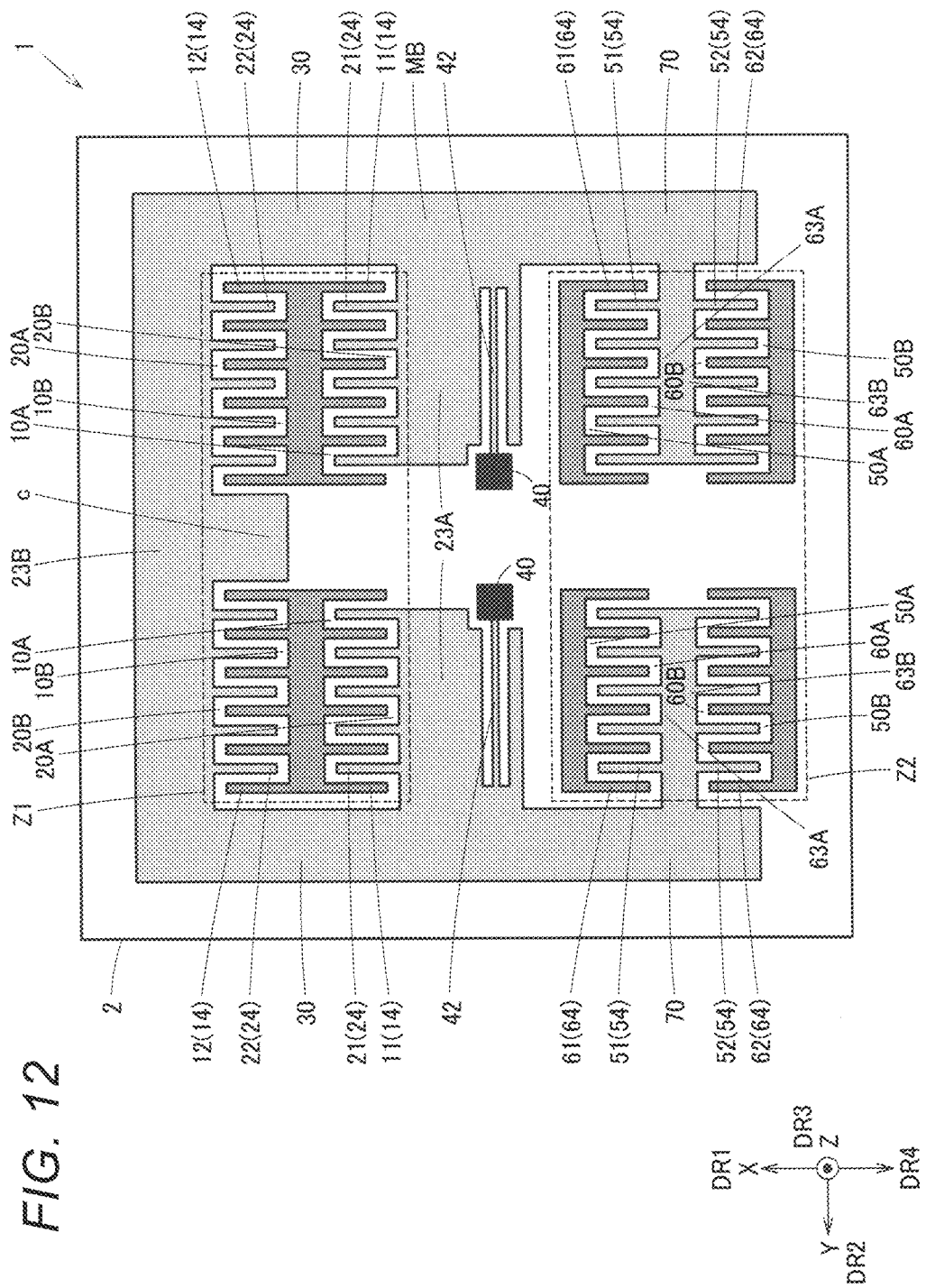
FIG. 12 is a plan view of a second detailed example.
Figure 13:
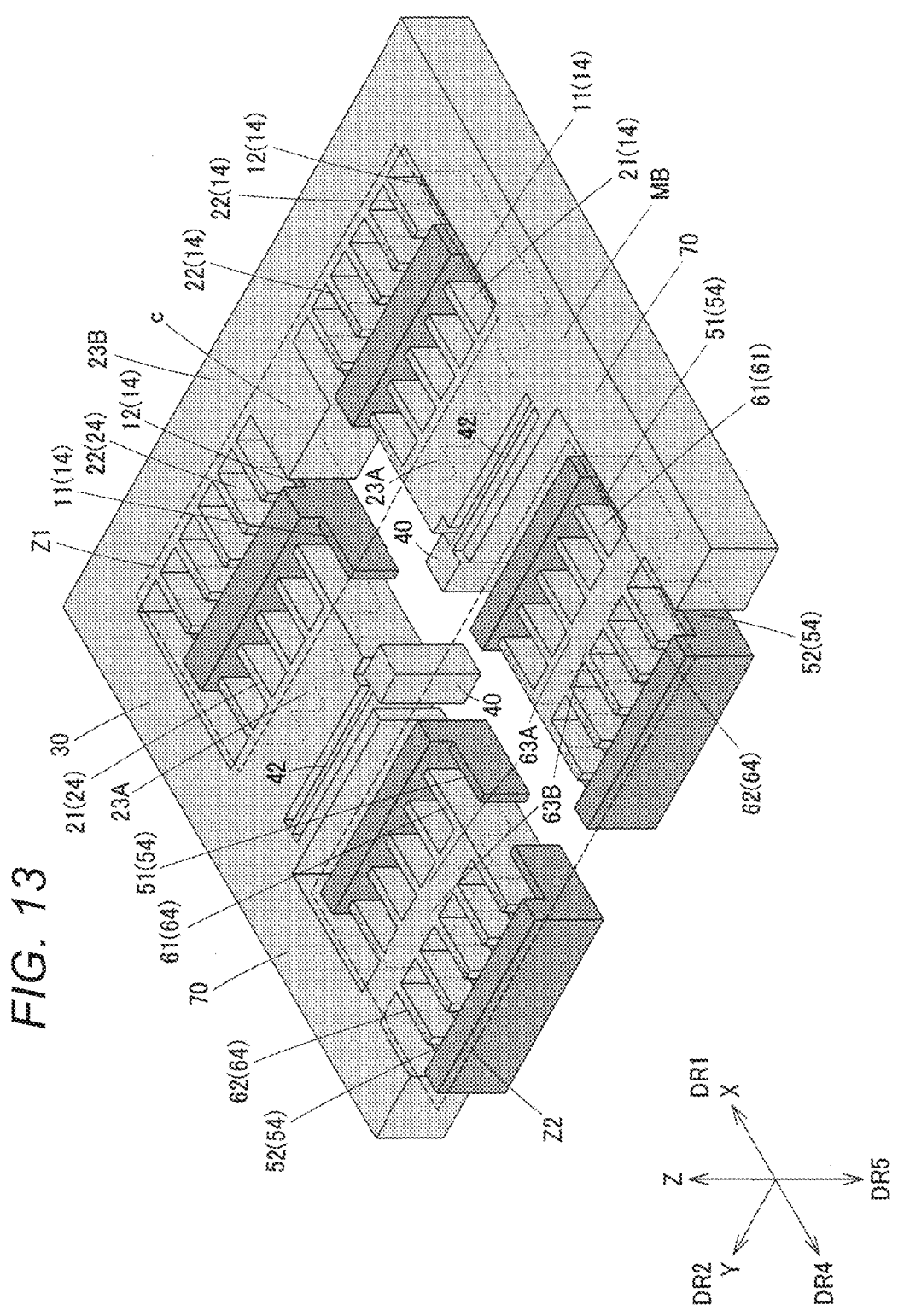
FIG. 13 is a perspective view of the second detailed example.

FIG. 12 is a plan view illustrating a second detailed example. As compared with the first detailed example illustrated in FIG. 7, on a first direction DR1 side of the support beam 42 serving as a rotation axis, the first fixed electrode portion 10A is divided into two parts and the third fixed electrode portion 10B is divided into two parts. A protrusion c is provided at a part of the third base portion 23B, and the protrusion c extends into a space between the divided parts. On a fourth direction DR4 side of the rotation axis, the second fixed electrode portion 50A is divided into two parts, the fourth fixed electrode portion 50B is divided into two parts, and the second base portion 63A is divided into two parts. FIG. 13 is a perspective view illustrating the second detailed example shown in FIG. 12.

When the second detailed example as illustrated in FIGS. 12 and 13 is adopted, since the protrusion c increases a mass of the third base portion 23B, the net inertial moment I described with reference to FIG. 9 is increased, and an effect of improving a detection sensitivity for a physical quantity of the physical quantity sensor 1 is obtained. Further, since the second fixed electrode portion 50A and the like are divided into two parts on the fourth direction DR4 side of the rotation axis, an electrode wiring can be provided in the space between the divided parts, and a device design when an SOI process is adopted can be facilitated. In this regard, in the first detailed example in which the second base portion 63A, the fourth base portion 63B, and the like are not divided into two parts, the movable body MB has a high rigidity and is less likely to be deformed. Accordingly, there is an advantage that impact resistance is excellent and the physical quantity can be accurately detected.

Figure 14:
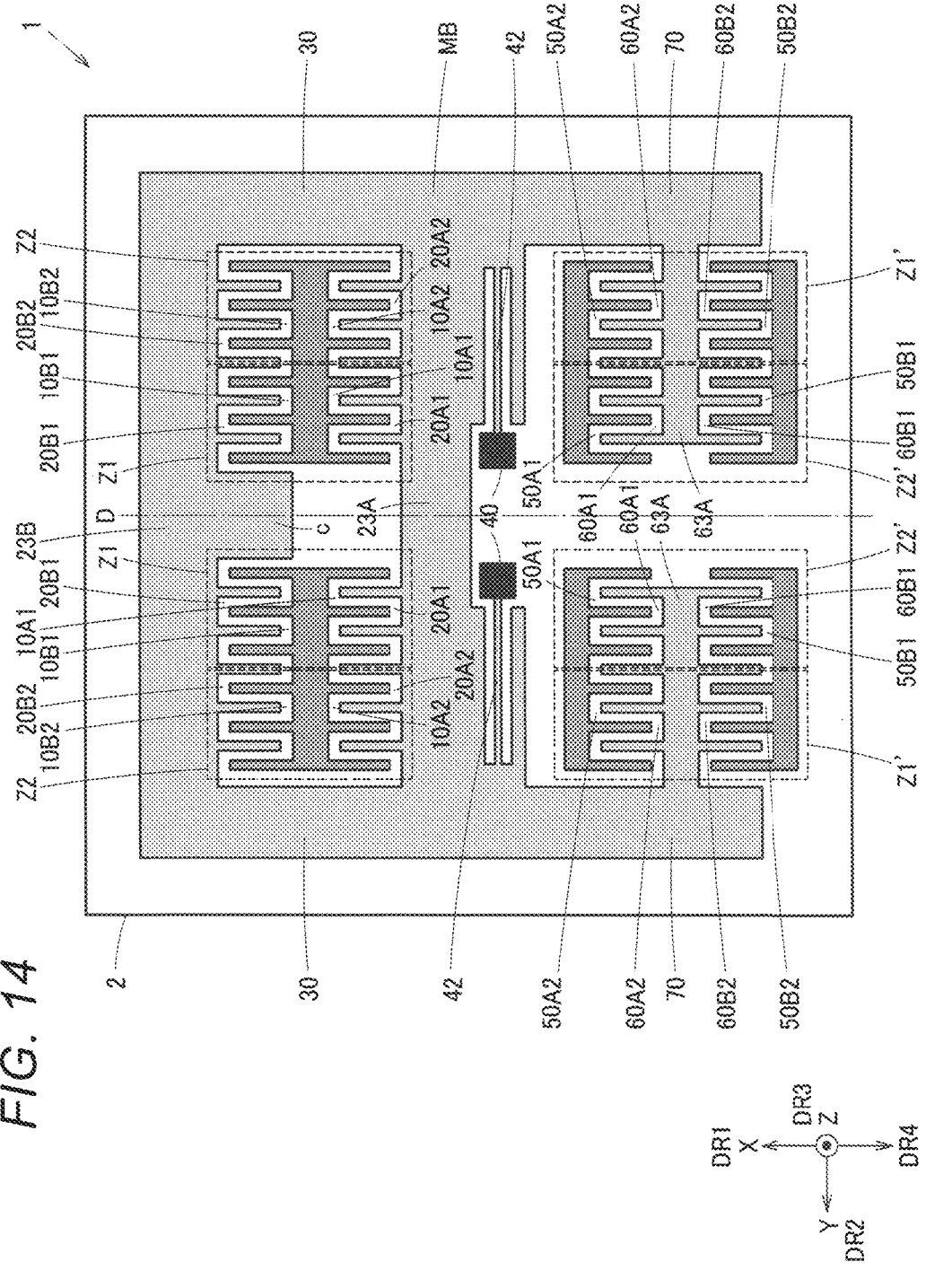
FIG. 14 is a plan view of a third detailed example.

FIG. 14 is a plan view of a third detailed example of the embodiment. The third detailed example is different from the second detailed example illustrated in FIG. 12 in a configuration of probe electrodes and a configuration of detection parts.

In the third detailed example, the first fixed electrode portion 10A includes a first fixed electrode group 10A1 and a second fixed electrode group 10A2, and the first movable electrode portion 20A includes a first movable electrode group 20A1 and a second movable electrode group 20A2. The second fixed electrode portion 50A includes a third fixed electrode group 50A1 and a fourth fixed electrode group 50A2, and the second movable electrode portion 60A includes a third movable electrode group 60A1 and a fourth movable electrode group 60A2. The third fixed electrode portion 10B includes a fifth fixed electrode group 10B1 and a sixth fixed electrode group 10B2, and the third movable electrode portion 20B includes a fifth movable electrode group 20B1 and a sixth movable electrode group 20B2. The fourth fixed electrode portion 50B includes a seventh fixed electrode group 50B1 and an eighth fixed electrode group 50B2, and the fourth movable electrode portion 60B includes a seventh movable electrode group 60B1 and an eighth movable electrode group 60B2.

In the third detailed example, the detection part Z1 and the detection part Z2 are provided side by side along the second direction DR2 on a first direction DR1 side of the support beam 42, and a detection part Z1' and a detection part Z2' are provided side by side along the second direction DR2 on a fourth direction DR4 side of the support beam 42. The detection part Z1 and the detection part Z2' are provided at symmetrical positions with respect to the support beam 42 serving as a rotation axis, and the detection part Z2 and the detection part Z1' are also provided at symmetrical positions with respect to the support beam 42 serving as the rotation axis.

As illustrated in FIG. 14, in the detection part Z1 on the first direction DR1 side of the support beam 42, the first fixed electrode group 10A1 and the first movable electrode group 20A1 are provided in a manner of facing each other in the second direction DR2, and the fifth fixed electrode group 10B1 and the fifth movable electrode group are provided in a manner of facing each other in the second direction DR2. In the detection part Z2, the second fixed electrode group 10A2 and the second movable electrode group 20A2 are provided in a manner of facing each other in the second direction DR2, and the sixth fixed electrode group 10B2 and the sixth movable electrode group 20B2 are provided in a manner of facing each other in the second direction DR2.

In the detection part Z2' on the fourth direction DR4 side of the support beam 42, the third fixed electrode group 50A1 and the third movable electrode group are provided in a manner of facing each other in the second direction DR2, and the seventh fixed electrode group and the seventh movable electrode group 60B1 are provided in a manner of facing each other in the second direction DR2. In the detection part Z1', the fourth fixed electrode group 50A2 and the fourth movable electrode group are provided in a manner of facing each other in the second direction DR2, and the eighth fixed electrode group and the eighth movable electrode group 60B2 are provided in a manner of facing each other in the second direction DR2.

Figure 15:
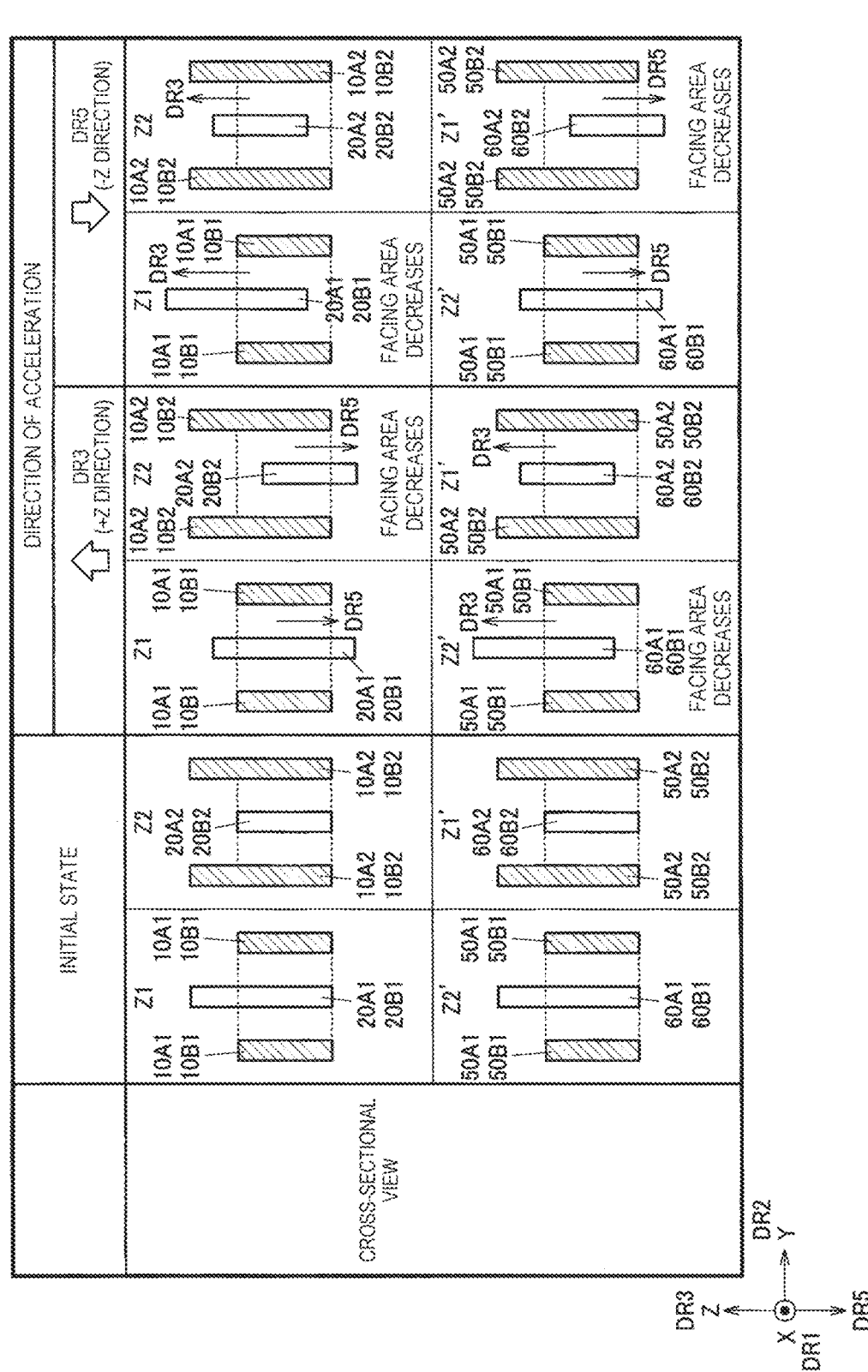
FIG. 15 is a diagram illustrating an operation of a detection part in the third detailed example.

FIG. 15 is a diagram illustrating operations of probe electrodes in each detection part in the third detailed example. An upper part of FIG. 15 illustrates the operations of the probe electrodes in the detection parts Z1 and Z2 provided on the first direction DR1 side of the rotation axis, and a lower part of FIG. 15 illustrates the operations of the probe electrodes in the detection parts Z1' and Z2' provided on the fourth direction DR4 side of the rotation axis. As shown in a left column of FIG. 15, in a stationary state, a thickness of the fixed probe electrode in the third direction DR3 is different between the detection parts Z1 and Z2 located on the first direction DR1 side of the rotation axis, and the second fixed electrode group 10A2 and the sixth fixed electrode group in the detection part Z2 are larger in thickness. A thickness of the movable probe electrode in the third direction DR3 is also different between the detection parts Z1 and Z2, and the first movable electrode group 20A1 and the fifth movable electrode group 20B1 in the detection part Z1 are larger in thickness. In the detection parts Z1' and Z2' on the fourth direction DR4 side of the rotation axis, the third fixed electrode group 50A1 and the seventh fixed electrode group 50B1 of the detection part Z2' are smaller in thickness. A thickness of the movable probe electrode in the third direction DR3 is also different between the detection parts Z1' and Z2', and the third movable electrode group 60A1 and the seventh movable electrode group 60B1 in the detection part Z2' are larger in thickness.

A central column and a right column of FIG. 15 illustrate the operations of the probe electrodes when an acceleration occurs when the third detailed example is adopted. Basically, the operations are similar to the operations illustrated in FIGS. 4 and 11, but in the third detailed example, the facing area between the probe electrodes is changed with the acceleration on either the first direction DR1 side or the fourth direction DR4 side of the rotation axis.

That is, in the embodiment, the first fixed electrode portion 10A includes the first fixed electrode group 10A1 and the second fixed electrode group 10A2 that are arranged side by side along the second direction DR2. The first movable electrode portion 20A includes the first movable electrode group 20A1 facing the first fixed electrode group 10A1, and the second movable electrode group facing the second fixed electrode group 10A2. The second fixed electrode portion 50A includes the third fixed electrode group 50A1 and the fourth fixed electrode group that are arranged side by side along the second direction DR2. The second movable electrode portion 60A includes the third movable electrode group 60A1 facing the third fixed electrode group 50A1, and the fourth movable electrode group 60A2 facing the fourth fixed electrode group A length of the first movable electrode group 20A1 in the third direction DR3 is different from a length of the second movable electrode group 20A2 in the third direction DR3, and a length of the third movable electrode group 60A1 in the third direction DR3 is different from a length of the fourth movable electrode group 60A2 in the third direction DR3.

In this way, the detection parts can be distributed on both sides of the support beam 42 serving as the rotation axis, and various variations in arrangement of the detection parts can be implemented. From the viewpoint of symmetry of the inertial moment I of the movable body MB, the thickness of the movable probe electrode in each detection part is preferably symmetrical with respect to a one-dot chain line indicated by D in FIG. 14.

Figure 16:
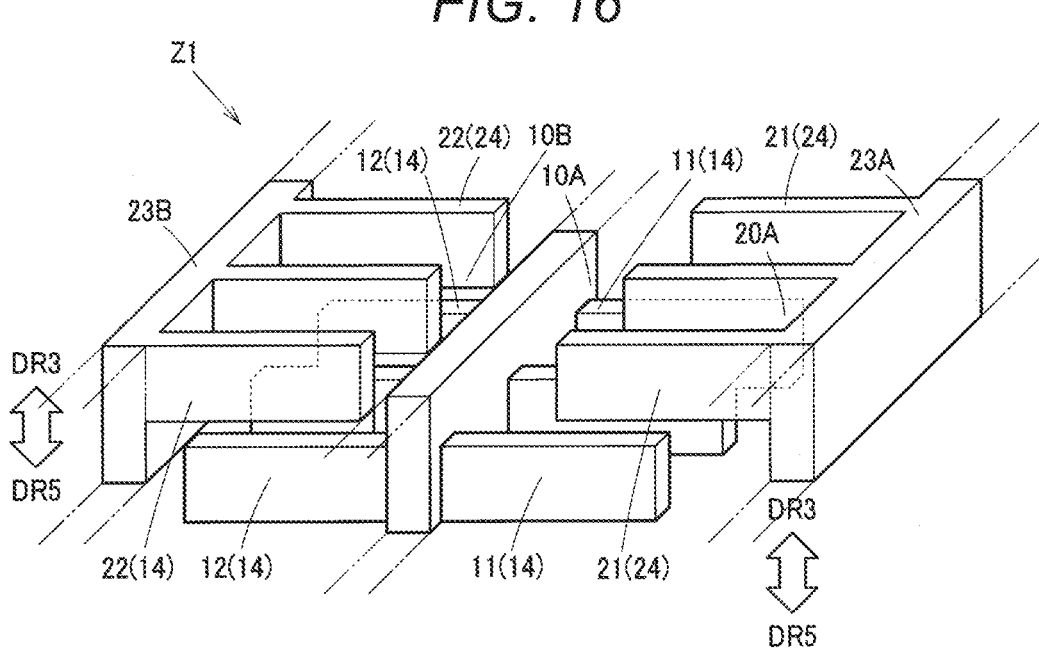
FIG. 16 is a perspective view of a detection part in a fourth detailed example.
Figure 16:
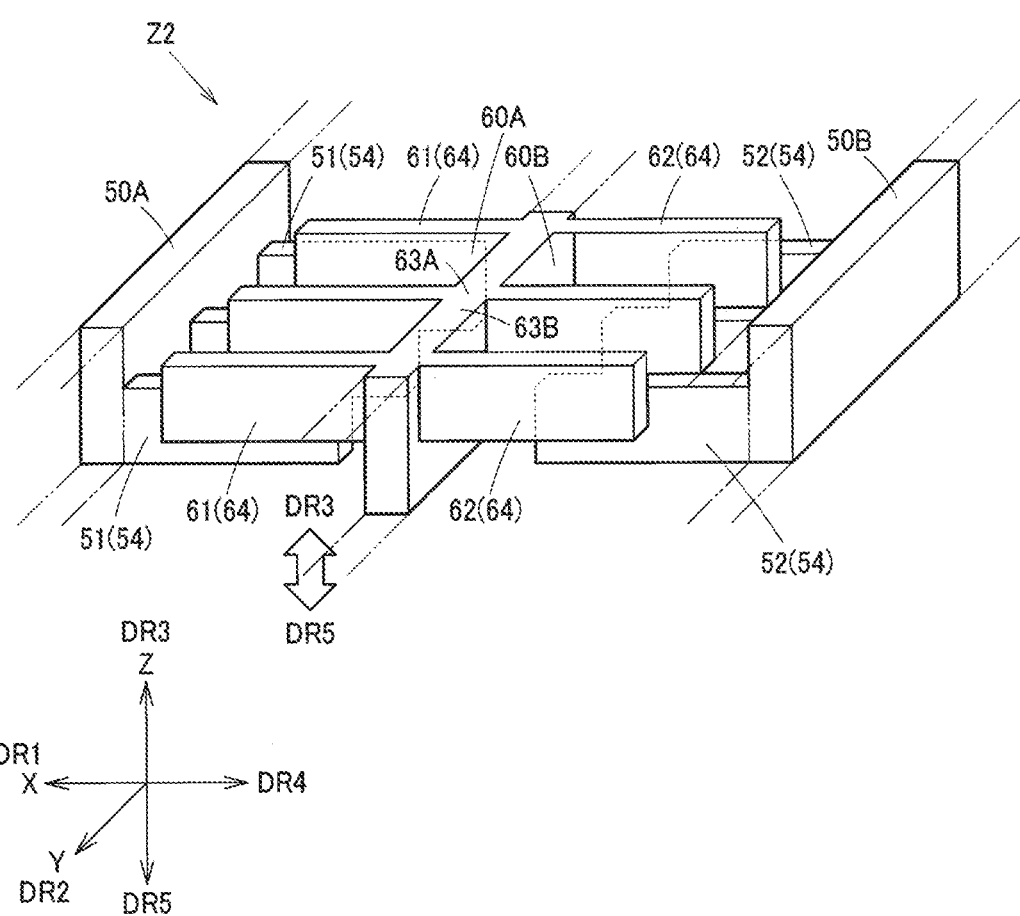

FIG. 16 is a perspective view illustrating a configuration of probe electrodes in a fourth detailed example of the embodiment. The fourth detailed example is a configuration example in which shapes of the probe electrodes are changed from those of the first detailed example illustrated in FIG. 7, and the other components have the same configuration as that of the first detailed example.

In the fourth detailed example, as illustrated in FIG. 16, the probe electrodes have a two-side offset shape. As illustrated in an upper part of FIG. 16, on a front surface side of the detection part Z1, that is, on a third direction DR3 side, the first movable electrode 21 and the third movable electrode 22 protrude further toward the third direction DR3 side than the first fixed electrode 11 and the third fixed electrode 12, and are not flush with the first fixed electrode 11 and the third fixed electrode 12. Further, on a back surface side of the detection part Z1, that is, on a fifth direction DR5 side, the first fixed electrode 11 and the third fixed electrode 12 protrude further toward the fifth direction DR5 side than the first movable electrode 21 and the third movable electrode 22, and are not flush with the first movable electrode 21 and the third movable electrode 22. The first fixed electrode 11, the third fixed electrode 12, the first movable electrode 21, and the third movable electrode 22 have the same thickness in the third direction DR3. Accordingly, in a cross-sectional view in the second direction DR2, the first fixed electrode 11 and the first movable electrode 21 partially overlap each other, and the third fixed electrode 12 and the third movable electrode 22 partially overlap each other, presenting the two-side offset shape at front and back surfaces of the detection part Z1. The probe electrodes in the detection part Z1 may have different thicknesses in the third direction DR3.

As illustrated in a lower part of FIG. 16, on a front surface side of the detection part Z2, the second fixed electrode 51 and the fourth fixed electrode 52 are recessed further toward the fifth direction DR5 side than the second movable electrode 61 and the fourth movable electrode 62, and are not flush with the second movable electrode 61 and the fourth movable electrode 62. On a back surface side of the detection part Z2, the second movable electrode 61 and the fourth movable electrode 62 are recessed further toward the third direction DR3 side than the second fixed electrode 51 and the fourth fixed electrode 52, and are not flush with the second fixed electrode 51 and the fourth fixed electrode 52. The probe electrodes of the detection part Z2 have the same thickness in the third direction DR3, but in a cross-sectional view, the second movable electrode 61 and the second fixed electrode 51 partially overlap each other, and the fourth movable electrode 62 and the fourth fixed electrode 52 partially overlap each other, presenting the two-side offset shape at front and back surfaces of the detection part Z2. The probe electrodes of the detection part Z2 may have different thicknesses in the third direction DR3.

Figure 17:
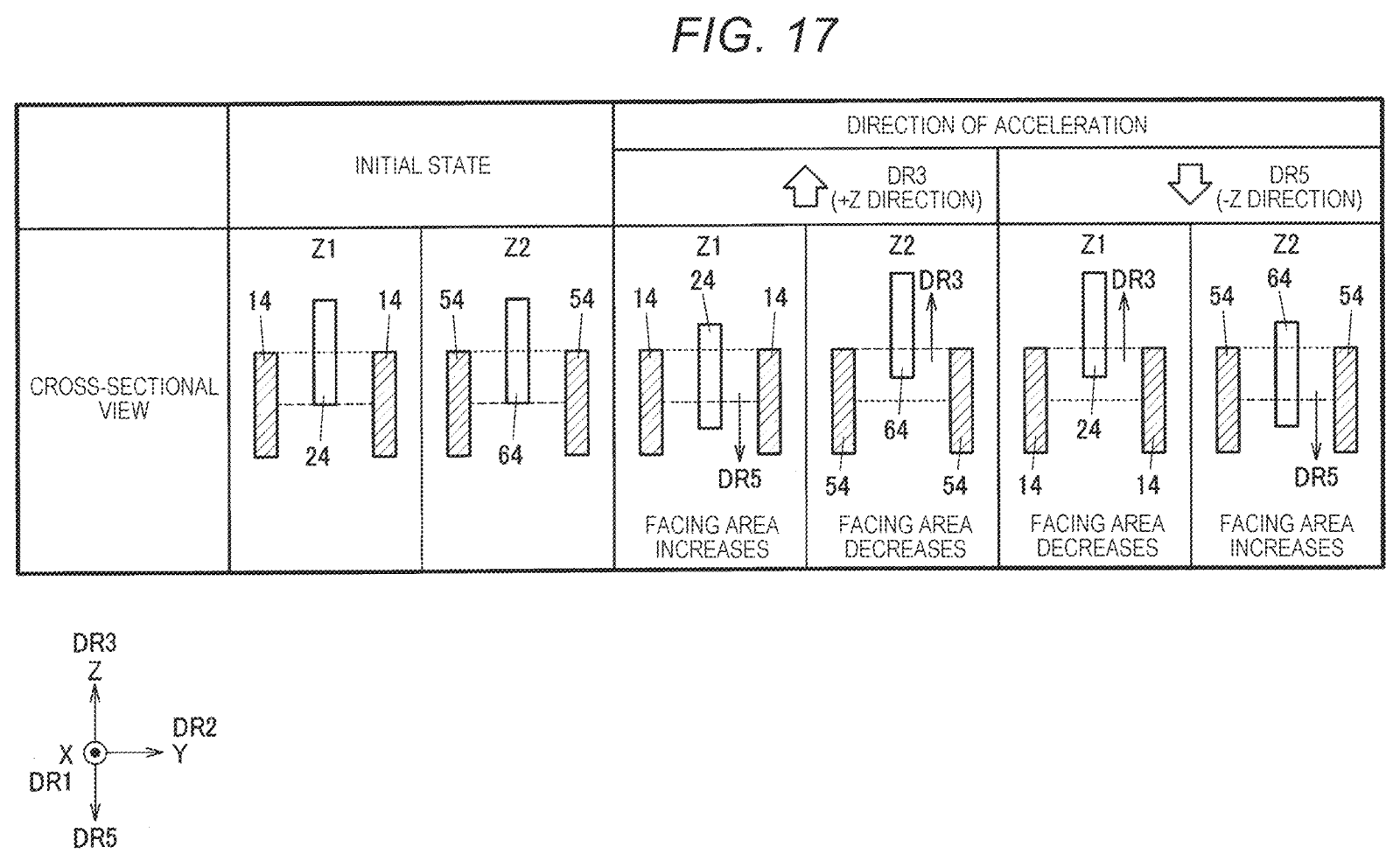

FIG. 17 is a diagram illustrating operations of the detection parts Z1 and Z2 when the fourth detailed example is adopted. In the fourth detailed example, basic operations are similar to those in FIG. 4. However, in the fourth detailed example, since the probe electrodes have the two-side offset shape, a change in the facing area is detected in both the detection parts Z1 and Z2 with respect to an acceleration in a certain direction. For example, when an acceleration in the third direction DR3 illustrated in a middle column of FIG. 17 occurs, in the detection part Z1, the movable electrode 24 receives an inertial force in a direction opposite to the third direction DR3 and is displaced to the fifth direction DR5 side. Therefore, the facing area between the fixed electrode 14 and the movable electrode 24 increases. Accordingly, in the detection part Z2, the movable electrode 64 is displaced to the third direction DR3 side, and the facing area between the fixed electrode 54 and the movable electrode 64 decreases.

When an acceleration in the fifth direction DR5 occurs, as illustrated in a right column of FIG. 17, in the detection part Z1, the movable electrode 24 receives the inertial force in the third direction DR3 and is displaced to the third direction DR3 side. Therefore, the facing area between the fixed electrode 14 and the movable electrode 24 decreases. Accordingly, the movable electrode 64 of the detection part Z2 is displaced to the fifth direction DR5 side, and the facing area between the fixed electrode 54 and the movable electrode 64 increases.

That is, in the embodiment, in a stationary state, a position of an end in the third direction DR3 of the first fixed electrode 11 of the first fixed electrode portion 10A is different from a position of an end in the third direction DR3 of the first movable electrode 21 of the first movable electrode portion 20A. A position of an end in the fifth direction DR5 opposite to the third direction DR3 of the first fixed electrode 11 of the first fixed electrode portion 10A is different from a position of an end in the fifth direction DR5 of the first movable electrode 21 of the first movable electrode portion 20A. A position of an end in the third direction DR3 of the second fixed electrode 51 of the second fixed electrode portion is different from a position of an end in the third direction DR3 of the second movable electrode 61 of the second movable electrode portion 60A. A position of an end in the fifth direction DR5 of the second fixed electrode 51 of the second fixed electrode portion 50A is different from a position of an end in the fifth direction DR5 of the second movable electrode 61 of the second movable electrode portion 60A.

In this way, with respect to the acceleration in the third direction DR3 or the fifth direction DR5, a change in the facing area between the facing probe electrodes is detected in any detection part. Therefore, a detection sensitivity for a physical quantity can be doubled as compared with that in the configuration example in FIG. 1, the first detailed example or the like.

Figure 18:
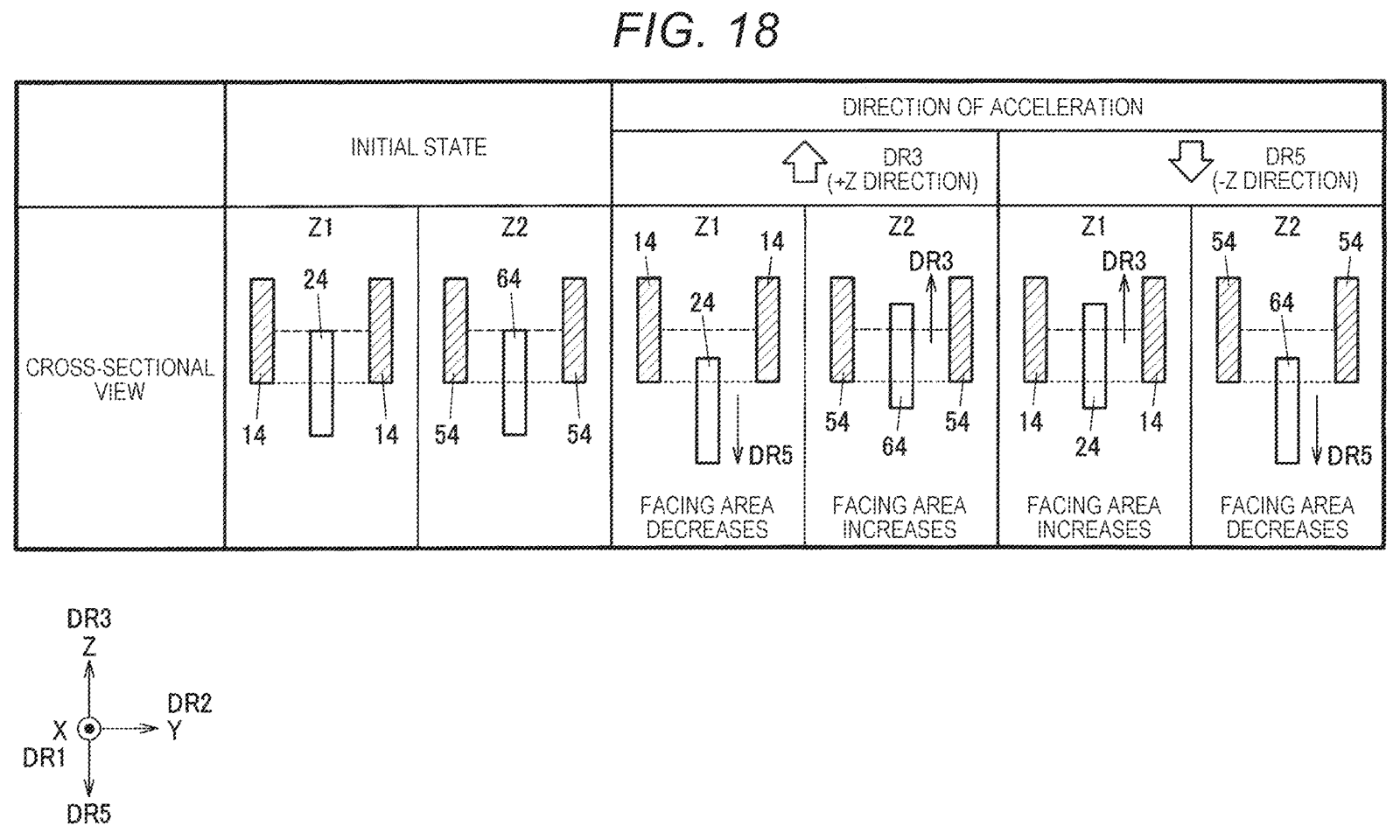

In the fourth detailed example illustrated in FIG. 16, a vertical positional relationship between the fixed electrode 14 and the movable electrode 24 may be reversed, and a vertical positional relationship between the fixed electrode 54 and the movable electrode 64 may be reversed. In this case, as illustrated in FIG. 18, with respect to the acceleration in the third direction DR3 or the fifth direction DR5, a change in the facing area is also detected in any detection part. A difference from the case illustrated in FIG. 17 is that increase and decrease of the facing area are reversed.

Figure 19:
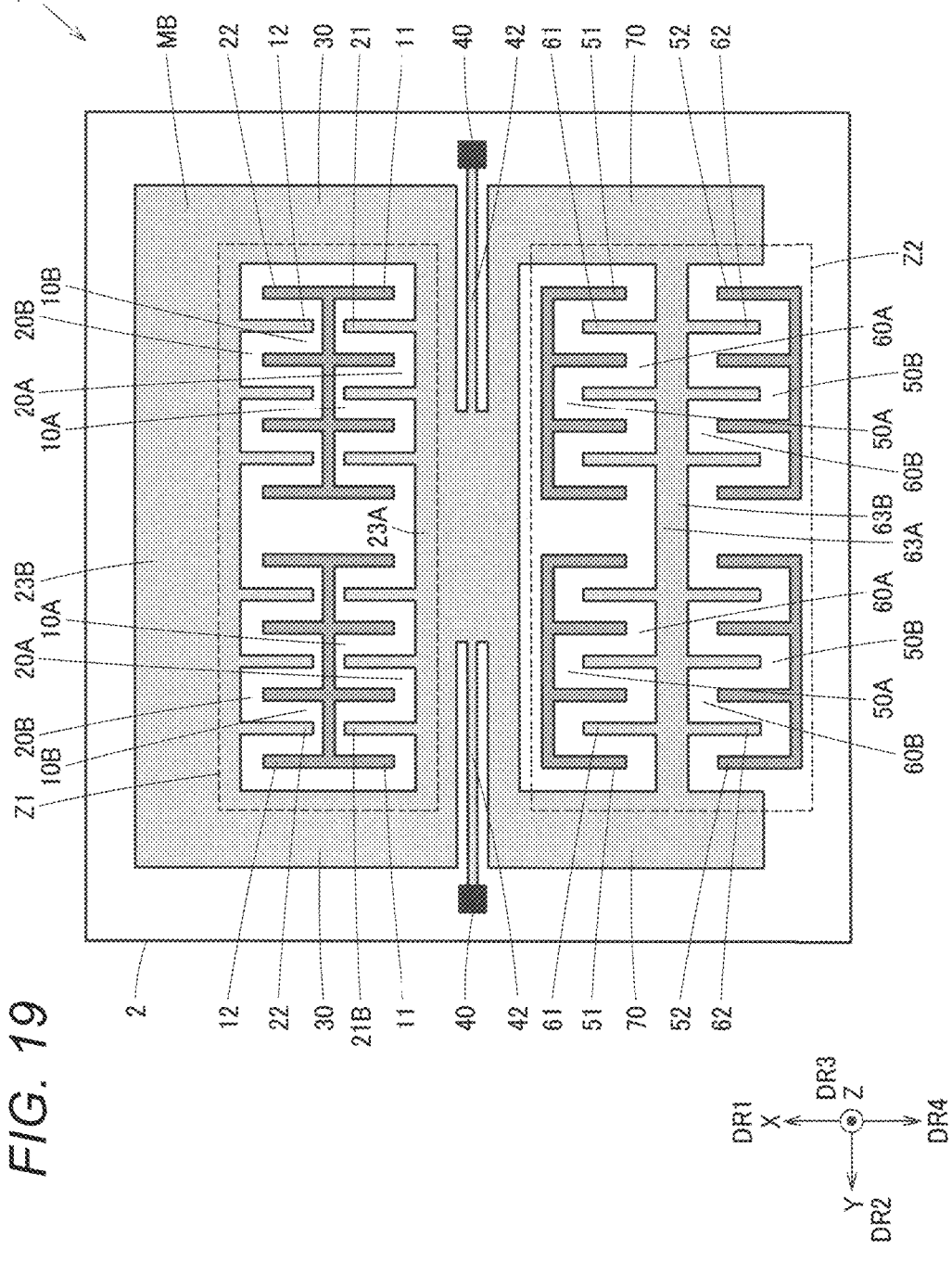
FIG. 19 is a plan view of a first modification of the embodiment.

FIG. 19 is a plan view of a first modification of the embodiment. The first modification is an example in which the fixed portion 40, which corresponds to an anchor portion in the seesaw movement of the movable body MB in the first detailed example illustrated in FIG. 7, is disposed at an outer side. The first modification having an outer anchor structure is desirable in that wiring can be easily routed while maintaining a high sensitivity.

Figure 20:
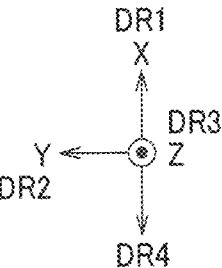
FIG. 20 is a plan view of a second modification of the embodiment.

FIG. 20 is a plan view of a second modification of the embodiment. The second modification has basically the same structure as the second detailed example illustrated in FIG. 12, but has a configuration in which the fixed portion 40, a first fixed electrode fixing portion 3 and second fixed electrode fixing portions 4 and 5 are collectively disposed at a center of the substrate 2. The first fixed electrode fixing portion 3 fixes the first fixed electrode portion 10A and the third fixed electrode portion 10B to the substrate 2, and the second fixed electrode fixing portions 4 and 5 fix the second fixed electrode portion 50A and the fourth fixed electrode portion 50B to the substrate 2.

That is, in the embodiment, the physical quantity sensor 1 includes the first fixed electrode fixing portion 3, a first fixed electrode base portion 13A, the second fixed electrode fixing portions 4 and 5, and a second fixed electrode base portion 53A. The first fixed electrode fixing portion 3 fixes the first fixed electrode portion 10A to the substrate 2. The first fixed electrode base portion 13A is provided at the first fixed electrode portion 10A, and the first fixed electrode extends from the first fixed electrode base portion 13A. The first fixed electrode base portion 13A extends from the first fixed electrode portion 10A in the fourth direction DR4 and is fixed to the first fixed electrode fixing portion 3. The second fixed electrode fixing portions 4 and 5 fix the second fixed electrode portions 50A to the substrate 2. The second fixed electrode base portion 53A is provided at the second fixed electrode portion 50A, and the second fixed electrode extends from the second fixed electrode base portion 53A. The second fixed electrode base portion 53A extends from the second fixed electrode portion 50A in the first direction DR1 and is fixed to the second fixed electrode fixing portion 4 or 5. The first fixed electrode fixing portion 3 is provided at a position closer to the fixed portion 40 than is the first fixed electrode portion 10A in the first direction DR1 of the support beam 42, and the second fixed electrode fixing portions 4 and 5 are provided at positions closer to the fixed portion 40 than is the second fixed electrode portion 50A in the fourth direction DR4 of the support beam 42. Therefore, even when warpage occurs in the substrate 2, the physical quantity sensor 1 is less likely to be affected. Therefore, according to the second modification, it is possible to prevent output fluctuation caused by an external stress, heat, or the like of the physical quantity sensor 1, and it is possible to detect a physical quantity with high accuracy.

In addition, by providing the movable body MB and the fixed electrode portions 10A, 10B, 50A, and 50B at positions close to the center of the substrate 2, when the warpage of the substrate 2 occurs, the influence thereof appears uniformly. Therefore, even when warpage occurs in the substrate 2, the physical quantity sensor 1 is less likely to be affected. Therefore, according to the second modification, it is possible to prevent output fluctuation caused by an external stress, heat, or the like of the physical quantity sensor 1, and it is possible to detect a physical quantity with high accuracy. In FIG. 20, the first fixed electrode fixing portion 3 couples the fixed electrode portions 10A and 10B, each of which is divided into right and left portions, to form one portion at a base portion. Further, although the fixing portion 4 and the fixing portion 5 are provided as separated fixing portions, the fixing portion 4 and the fixing portion 5 may be coupled to each other to form one fixing portion.

Figure 21:
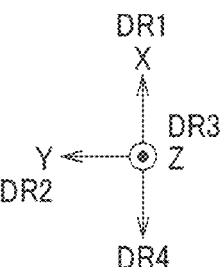
FIG. 21 is a plan view of a third modification of the embodiment.
Figure 22:
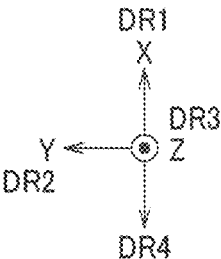
FIG. 22 is a plan view of a third modification of the embodiment.

FIG. 21 is a plan view of a third modification of the embodiment. The third modification is a configuration example illustrated in FIG. 9 in which a plurality of areas in each of which the probe electrodes face each other are provided on both sides of the support beam 42 serving as a rotation axis, and is a configuration example in which four rows of the areas are provided on each of both sides of the rotation axis. In the third modification, for example, the first base portion 23A, the third base portion 23B, and a fifth base portion 23C are provided on a first direction DR1 side of the rotation axis, and probe electrodes are provided on both sides of the base portion. When the number of areas is increased under the same element size, a length of each probe electrode along the first direction can be shortened, and thus impact resistance of the physical quantity sensor 1 can be improved. The third modification may have a configuration as illustrated in FIG. 22. In FIG. 22, the number of areas in each of which the probe electrodes face each other is reduced to three as compared with that in FIG. 21. A direction in which each probe electrode extends is opposite to a direction in which the probe electrode extends in FIG. 21. For example, in the third modification example illustrated in FIG. 21, the first movable electrode 21 extends in the first direction DR1, but in the configuration example illustrated in FIG. 22, the first movable electrode 21 extends in the fourth direction DR4. As described, in the third modification, there are variations in the number of rows of the areas in each of which the probe electrodes face each other provided or in the direction in which each probe electrode extends.

Figure 23:
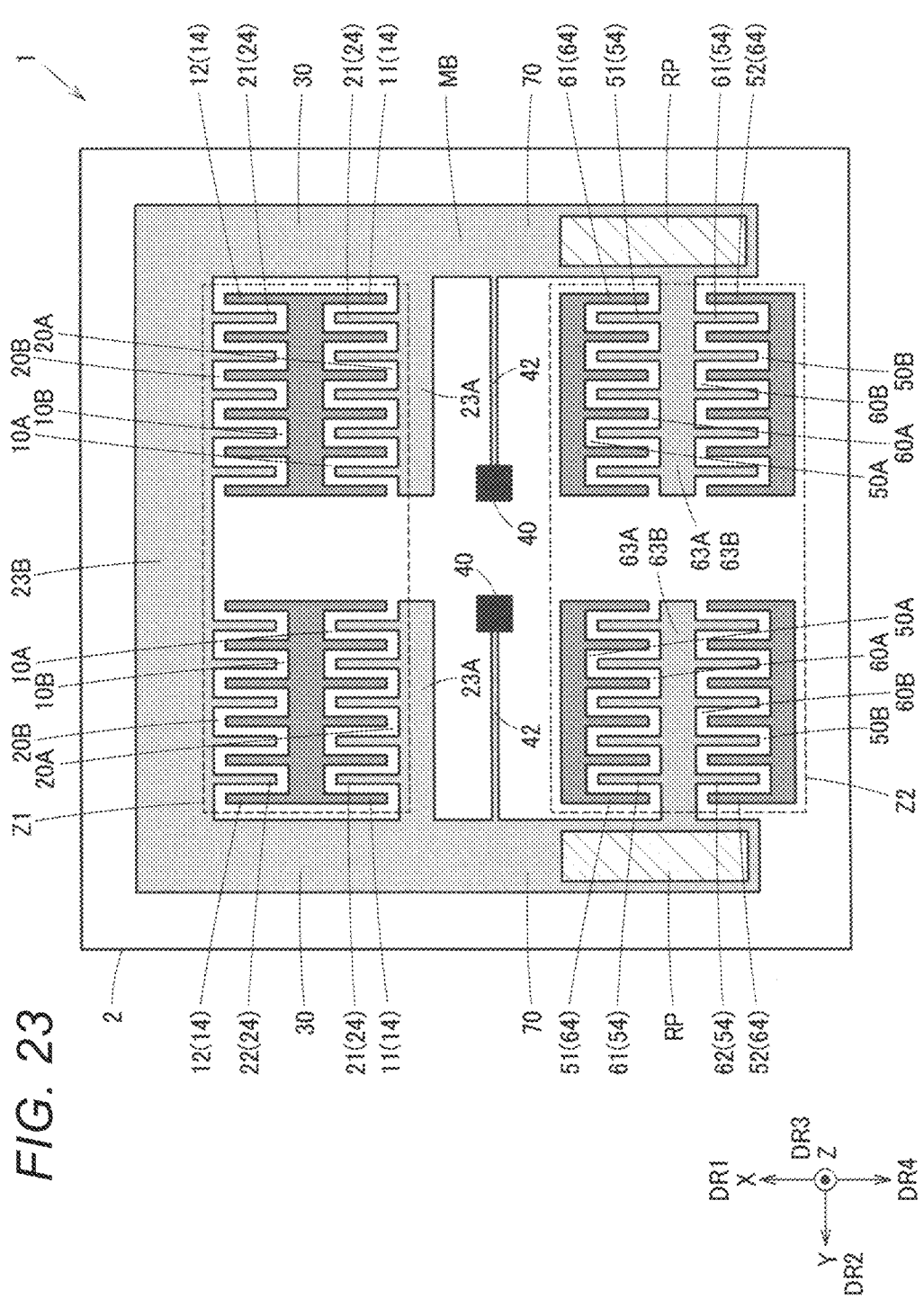
FIG. 23 is a plan view of a fourth modification of the embodiment.

FIG. 23 is a plan view of a fourth modification of the embodiment. In the fourth modification, a groove portion RP as a part of the movable body MB is provided. The groove portion RP is provided in a part of a front surface on a third direction side of the second coupling portion 70 of the movable body MB, and has a partially recessed shape. As described, by providing the groove portion RP on a fourth direction DR4 side from the support beam 42 serving as a rotation axis in the movable body MB, it is possible to reduce the inertial moment $I_{Z2}$ on the fourth direction DR4 side from the rotation axis of the movable body MB. As described with reference to FIGS. 6 and 9, in the embodiment, the inertial moment $I_{Z2}$ of the movable body MB on the fourth direction DR4 side is smaller than the inertial moment $I_{Z1}$ of the movable body MB on a first direction DR1 side, and thus a net inertial moment of the entire movable body MB is obtained. Therefore, in the fourth modification, by providing the groove portions RP, the inertial moment $I_{Z2}$ can be reduced, and the net inertial moment of the entire movable body MB can be increased. Accordingly, it is possible to improve a detection sensitivity for a physical quantity of the physical quantity sensor 1. Regarding the shape of the groove portion RP, the groove portion RP may be provided in a portion of the second coupling portion 70 that is far from the support beam 42 serving as the rotation axis and a depth of the groove portion RP may be increased, thereby enhancing the effect of reducing the inertial moment $I_{Z2}$.

Figure 24:
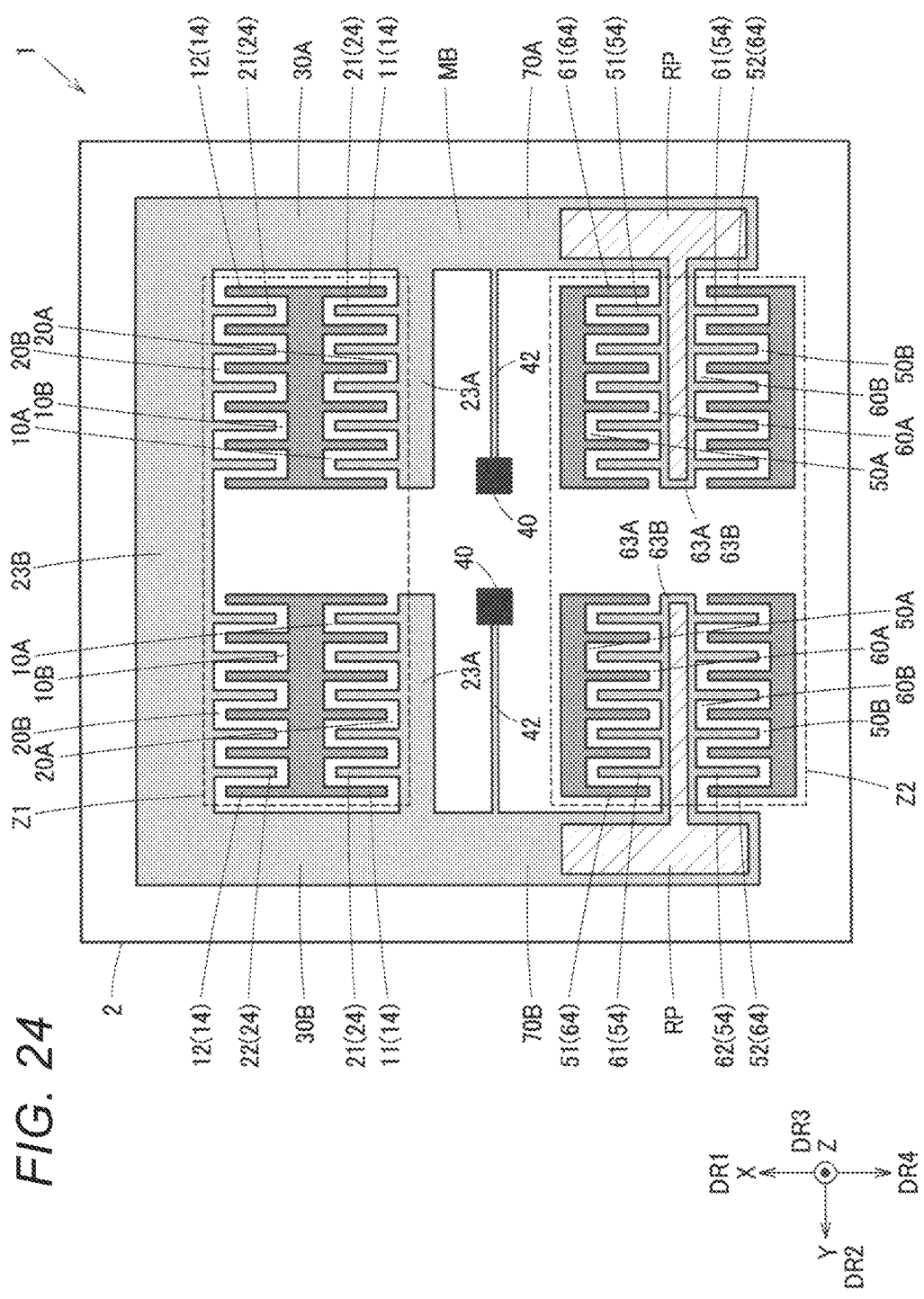
FIG. 24 is a plan view of a fourth modification of the embodiment.

As a variation of the shape of the groove portion RP in the fourth modification, a configuration as illustrated in FIG. 24 is also conceivable. That is, the groove portion RP can be provided not only in the second coupling portion 70 but also in the second base portion 63A. In this way, it is possible to further reduce the inertial moment $I_{Z2}$ on the fourth direction DR4 side from the rotation axis of the movable body MB as compared with the configuration illustrated in FIG. 23, and it is possible to further improve the detection sensitivity for the physical quantity of the physical quantity sensor 1.

That is, in a physical quantity sensor according to the embodiment, the second coupling portion 70 has the groove portion RP recessed in the fifth direction DR5 in a plan view.

In this way, a mass of the second coupling portion 70 can be reduced, and the inertial moment $I_{Z2}$ of the movable body MB on the fourth direction DR4 side from the rotation axis can be reduced. Accordingly, the net inertial moment I of the entire movable body MB can be increased. Therefore, according to the fourth modification, it is possible to improve the detection sensitivity for the physical quantity of the physical quantity sensor 1.

3. Inertial Measurement Unit

Figure 25:
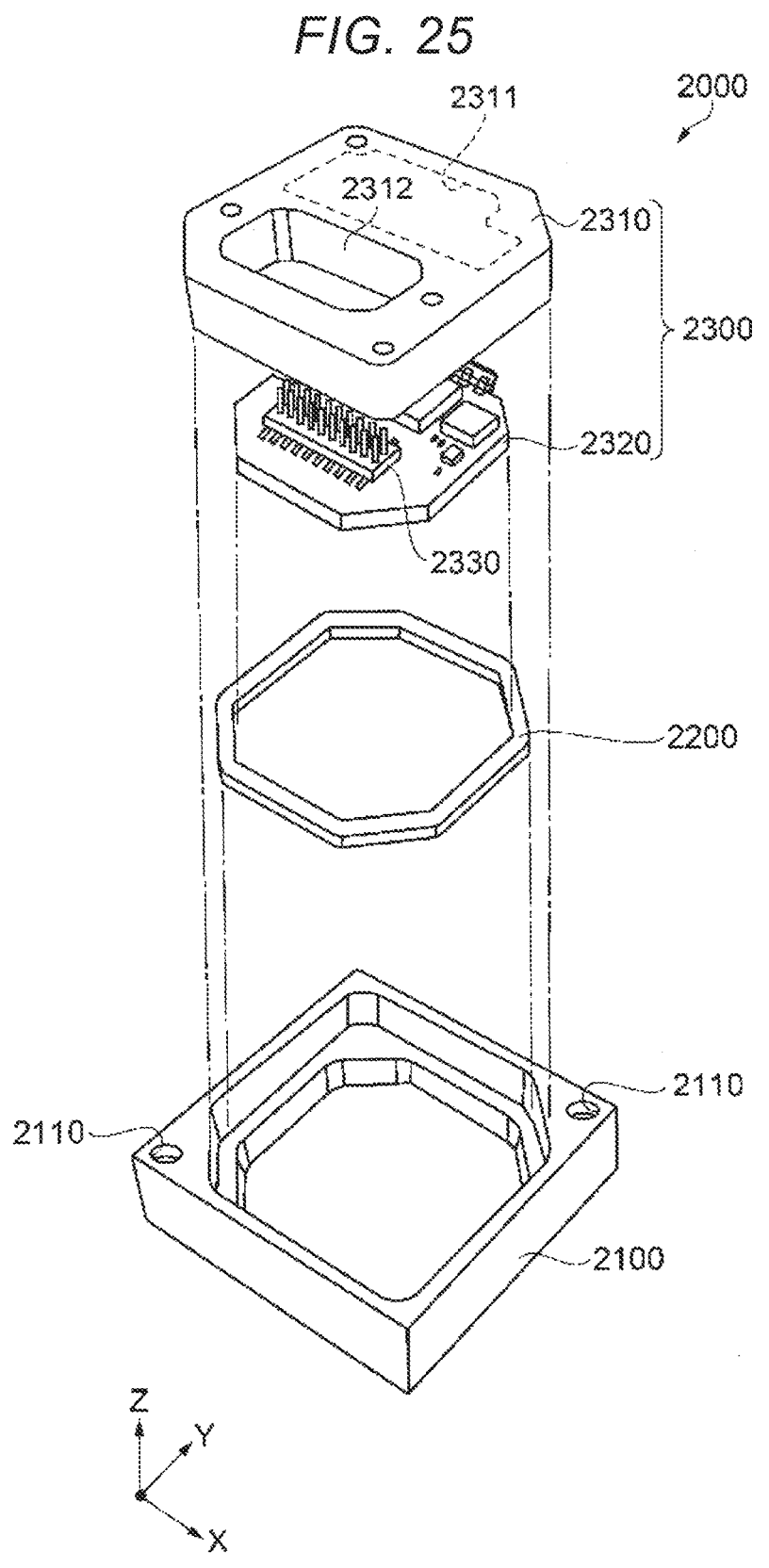

Next, an example of an inertial measurement unit 2000 according to the embodiment will be described with reference to FIGS. 25 and 26. The inertial measurement unit (IMU) 2000 illustrated in FIG. 25 is a unit that detects an inertial motion amount of a posture, an action or the like of a moving body such as an automobile or a robot. The inertial measurement unit 2000 is a so-called six-axis motion sensor including an acceleration sensor that detects accelerations ax, ay, and az in directions along three axes and an angular velocity sensor that detects angular velocities ωx, ωy, and ωz around the three axes.

The inertial measurement unit 2000 is a rectangular parallelepiped having a substantially square planar shape. Screw holes 2110 as mount portions are formed in the vicinity of two vertexes positioned in a diagonal direction of the square. Two screws can pass through the two screw holes 2110 to fix the inertial measurement unit 2000 to a mounted surface of a mounted body such as an automobile. By component selection or design change, for example, it is also possible to reduce a size of the inertial measurement unit 2000 to such a degree that the inertial measurement unit 2000 can be mounted on a smartphone or a digital camera.

The inertial measurement unit 2000 includes an outer case 2100, a bonding member 2200, and a sensor module 2300, and has a configuration in which the sensor module 2300 is inserted inside the outer case 2100 with the bonding member 2200 interposed therebetween. The sensor module 2300 includes an inner case 2310 and a circuit board 2320. A recess 2311 for preventing contact with the circuit board 2320 and an opening 2312 for exposing a connector 2330 to be described later are formed in the inner case 2310. Further, the circuit board 2320 is bonded to a lower surface of the inner case 2310 via an adhesive.

Figure 26:
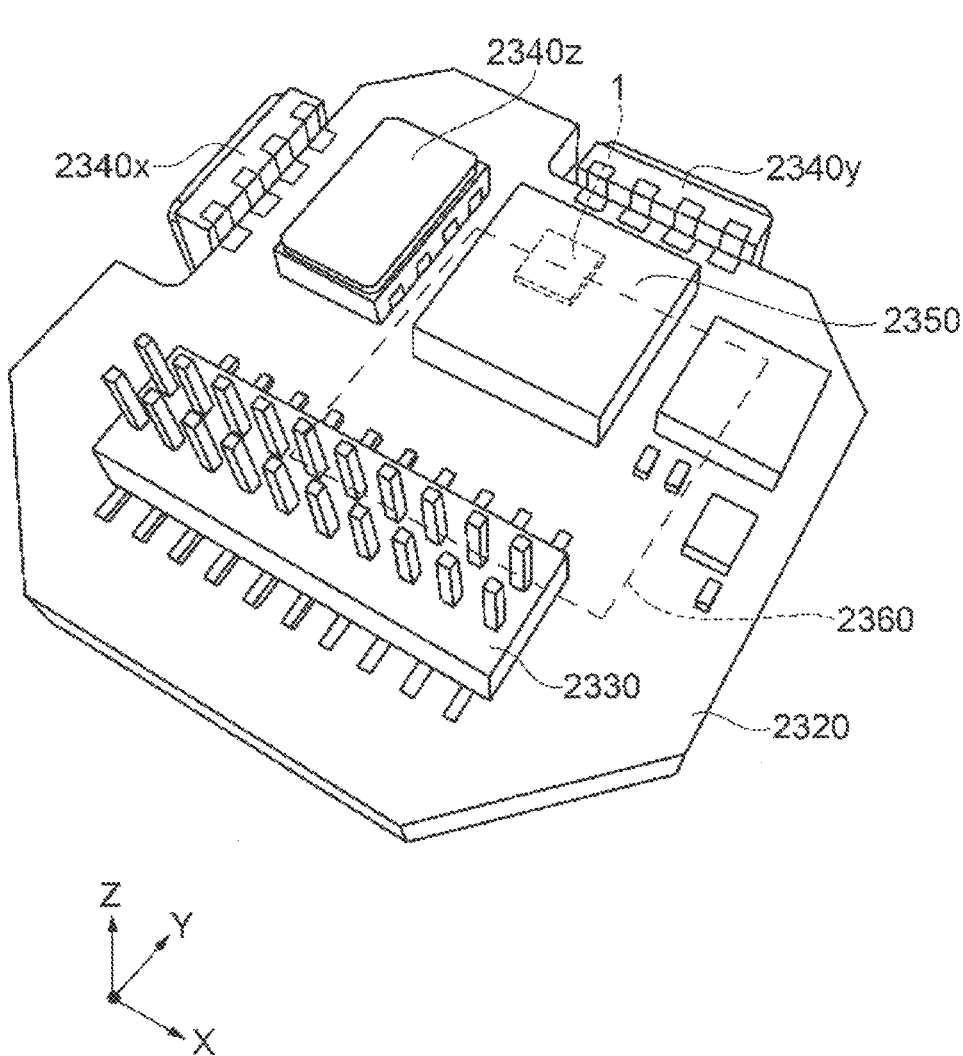
FIG. 26 is a perspective view of a circuit board of the physical quantity sensor.

As illustrated in FIG. 26, the connector 2330, an angular velocity sensor 2340z that detects an angular velocity around the Z axis, an acceleration sensor unit 2350 that detects an acceleration in each axial direction of the X axis, the Y axis, and the Z axis, and the like are mounted at an upper surface of the circuit board 2320. Further, an angular velocity sensor 2340x that detects an angular velocity around the X axis and an angular velocity sensor 2340y that detects an angular velocity around the Y axis are mounted at side surfaces of the circuit board 2320.

The acceleration sensor unit 2350 includes at least the physical quantity sensor 1 for measuring the acceleration in the Z-axis direction described above, and can detect an acceleration in one axial direction or an acceleration in two axial directions or three axial directions as necessary. The angular velocity sensors 2340x, 2340y, and 2340z are not particularly limited, and for example, a vibration gyro sensor using the Coriolis force can be used.

Further, a control IC 2360 is mounted at a lower surface of the circuit board 2320. The control IC 2360 serving as a control unit that performs control based on a detection signal output from the physical quantity sensor 1 is, for example, a micro controller unit (MCU), includes a storage unit including a nonvolatile memory, an A/D converter, and the like therein, and controls each unit of the inertial measurement unit 2000. In addition, a plurality of electronic components are mounted at the circuit board 2320.

As described above, the inertial measurement unit 2000 according to the embodiment includes the physical quantity sensor 1 and the control IC 2360 serving as the control unit that performs the control based on the detection signal output from the physical quantity sensor 1. According to the inertial measurement unit 2000, since the acceleration sensor unit 2350 including the physical quantity sensor 1 is used, the inertial measurement unit 2000 capable of enjoying an effect of the physical quantity sensor 1 and implementing high accuracy and the like can be provided.

The inertial measurement unit 2000 is not limited to the configurations in FIGS. 25 and 26. For example, the inertial measurement unit 2000 may have a configuration in which only the physical quantity sensor 1 is provided as the inertial sensor without providing the angular velocity sensors 2340x, 2340y, and 2340z. In this case, for example, the inertial measurement unit 2000 may be implemented by accommodating the physical quantity sensor 1 and the control IC 2360, which implements the control unit, in a package that is an accommodating container.

As described above, the physical quantity sensor according to the embodiment is a physical quantity sensor that detects, when three directions orthogonal to each other are defined as a first direction, a second direction, and a third direction, a physical quantity in the third direction. The physical quantity sensor according to the embodiment includes a fixed portion, a support beam, a movable body, a first fixed electrode portion, and a second fixed electrode portion. The fixed portion is fixed at a substrate. The support beam has one end coupled to the fixed portion and is provided along the second direction. The movable body is coupled to the other end of the support beam. The first fixed electrode portion and the second fixed electrode portion are provided at the substrate. The movable body includes a first coupling portion, a first base portion, a first movable electrode portion, a second coupling portion, a second base portion, and a second movable electrode portion. The first coupling portion is coupled to the other end of the support beam and extends in the first direction from the support beam. The first base portion is coupled to the first coupling portion and is provided along the second direction. A first movable electrode of the first movable electrode portion extends from the first base portion in the first direction, and faces a first fixed electrode of the first fixed electrode portion in the second direction. The second coupling portion is coupled to the other end of the support beam and extends from the support beam in a fourth direction opposite to the first direction. The second base portion is coupled to the second coupling portion and is provided along the second direction. A second movable electrode of the second movable electrode portion extends from the second base portion in the first direction, and faces a second fixed electrode of the second fixed electrode portion in the second direction.

In this way, the first base portion and the first movable electrode portion, and the second base portion and the second movable electrode portion, which are provided on two sides of the support beam serving as a rotation axis, can be disposed at positions that are non-symmetrical with respect to the rotation axis, and an inertial moment of the entire movable body can be obtained. Accordingly, a detection sensitivity for a physical quantity of the physical quantity sensor can be easily improved.

Further, in the embodiment, the first movable electrode portion and the second movable electrode portion are provided at symmetrical positions in the first direction with respect to the support beam.

In this way, since detection parts are arranged symmetrically with respect to the rotation axis, it is possible to implement a physical quantity sensor excellent in linearity of positive and negative detection characteristics.

Further, in the embodiment, the physical quantity sensor further includes a third fixed electrode portion and a fourth fixed electrode portion which are provided at the substrate. The movable body further includes a third base portion, a third movable electrode portion, a fourth base portion, and a fourth movable electrode portion. The third base portion is coupled to the first coupling portion and is provided along the second direction. A third movable electrode of the third movable electrode portion extends in the fourth direction from the third base portion, and faces a third fixed electrode of the third fixed electrode portion in the second direction. The fourth base portion is coupled to the second coupling portion and is provided along the second direction. A fourth movable electrode of the fourth movable electrode portion extends in the fourth direction from the fourth base portion, and faces a fourth fixed electrode of the fourth fixed electrode portion in the second direction.

In this way, on a first direction side of the rotation axis, not only a facing area between the first fixed electrode and the first movable electrode but also a facing area between the third fixed electrode and the third movable electrode is changed in response to a swing movement of the movable body accompanying an acceleration. On a fourth direction side of the rotation axis, not only the facing area between the second fixed electrode and the second movable electrode but also the facing area between the fourth fixed electrode and the fourth movable electrode is changed. Accordingly, it is possible to detect a change in the physical quantity by using more probe electrodes, and it is possible to improve the detection sensitivity for the physical quantity of the physical quantity sensor. Further, the third base portion can be provided at a position farther away from the rotation axis than are the first base portion and the second base portion, a larger inertial moment of the movable body can be obtained, and a high sensitivity of the physical quantity sensor can be achieved.

Further, in the embodiment, the third movable electrode portion and the fourth movable electrode portion are provided at symmetrical positions in the first direction with respect to the support beam.

In this way, the second base portion provided on the fourth side of the support beam serving as the rotation axis can be disposed non-symmetrically to the first base portion and the third base portion with respect to the rotation axis. Therefore, the inertial moment of the entire movable body can be efficiently obtained with a smaller space. Accordingly, it is possible to implement a physical quantity sensor having a small size and a high detection sensitivity. Further, since the third movable electrode portion and the fourth movable electrode portion are also arranged symmetrically with respect to the rotation axis, it is possible to implement a physical quantity sensor excellent in linearity of positive and negative detection characteristics.

Further, in the embodiment, a thickness of the first movable electrode of the first movable electrode portion in the third direction is different from a thickness of the first fixed electrode of the first fixed electrode portion in the third direction, and a thickness of the second movable electrode of the second movable electrode portion in the third direction is different from a thickness of the second fixed electrode of the second fixed electrode portion in the third direction.

In this way, a change in the physical quantity in both the third direction and the fifth direction can be detected.

Further, in the embodiment, a thickness of the first movable electrode of the first movable electrode portion in the third direction is larger than a thickness of the first fixed electrode of the first fixed electrode portion in the third direction, and a thickness of the second movable electrode of the second movable electrode portion in the third direction is larger than a thickness of the second fixed electrode of the second fixed electrode portion in the third direction.

In this way, a change in the physical quantity in both the third direction and the fifth direction can be detected.

A thickness of the first movable electrode of the first movable electrode portion in the third direction is smaller than a thickness of the first fixed electrode of the first fixed electrode portion in the third direction, and a thickness of the second movable electrode of the second movable electrode portion in the third direction is smaller than a thickness of the second fixed electrode of the second fixed electrode portion in the third direction.

In this way, a change in the physical quantity in both the third direction and the fifth direction can be detected.

In the embodiment, positions of back surfaces of the first movable electrode portion and the first fixed electrode portion in the third direction coincide with each other, and positions of back surfaces of the second movable electrode portion and the second fixed electrode portion in the third direction coincide with each other.

In this way, by forming electrode materials constituting the first movable electrode portion, the first fixed electrode portion, the second movable electrode portion, and the second fixed electrode portion in the same process, it is possible to implement a configuration in which back surfaces of the probe electrodes are flush with one another. Since the electrodes can be formed by processing such as etching, the manufacturing process can be facilitated.

Further, in the embodiment, the first fixed electrode portion includes a first fixed electrode group and a second fixed electrode group that are arranged side by side along the second direction. The first movable electrode portion includes a first movable electrode group facing the first fixed electrode group, and a second movable electrode group facing the second fixed electrode group. The second fixed electrode portion includes a third fixed electrode group and a fourth fixed electrode group that are arranged side by side along the second direction. The second movable electrode portion includes a third movable electrode group facing the third fixed electrode group, and a fourth movable electrode group facing the fourth fixed electrode group. A length of the first movable electrode group in the third direction is different from a length of the second movable electrode group in the third direction, and a length of the third movable electrode group in the third direction is different from a length of the fourth movable electrode group in the third direction.

In this way, the detection parts can be distributed on both sides of the support beam serving as the rotation axis, and various variations in arrangement of the detection parts can be implemented.

That is, in the embodiment, in a stationary state, a position of an end in the third direction of the first fixed electrode of the first fixed electrode portion is different from a position of an end in the third direction of the first movable electrode of the first movable electrode portion. A position of an end in the fifth direction of the first fixed electrode of the first fixed electrode portion is different from a position of an end in the fifth direction of the first movable electrode of the first movable electrode portion. A position of an end in the third direction of the second fixed electrode of the second fixed electrode portion is different from a position of an end in the third direction of the second movable electrode of the second movable electrode portion. A position of an end in the fifth direction of the second fixed electrode of the second fixed electrode portion is different from a position of an end in the fifth direction of the second movable electrode of the second movable electrode portion.

In this way, with respect to the acceleration in the third direction or the fifth direction, a change in the facing area between the facing probe electrodes can be detected in any detection part. Therefore, the detection sensitivity for the physical quantity can be increased as compared with a case where probe electrodes having one-side offset shape are adopted.

Further, in the embodiment, the second coupling portion has a groove portion recessed in the third direction in a plan view.

In this way, a mass of the second coupling portion can be reduced, and the inertial moment of the movable body on the fourth direction side from the rotation axis can be reduced. Accordingly, the net inertial moment of the entire movable body can be increased. Therefore, according to the fourth modification, it is possible to improve the detection sensitivity for the physical quantity of the physical quantity sensor.

Further, in the embodiment, the physical quantity sensor further includes a first fixed electrode fixing portion, a first fixed electrode base portion, a second fixed electrode fixing portion, and a second fixed electrode base portion. The first fixed electrode fixing portion fixes the first fixed electrode portion to the substrate. The first fixed electrode base portion is coupled to the first fixed electrode fixing portion, and the first fixed electrode extends from the first fixed electrode base portion. The second fixed electrode fixing portion fixes the second fixed electrode portion to the substrate. The second fixed electrode base portion is coupled to the second fixed electrode fixing portion, and the second fixed electrode extends from the second fixed electrode base portion. The first fixed electrode fixing portion is provided at a position closer to the fixed portion than is the first fixed electrode portion in the first direction of the support beam, and the second fixed electrode fixing portion is provided at a position closer to the fixed portion than is the second fixed electrode portion in the fourth direction of the support beam.

In this case, since the movable body and the fixed electrode portions are provided at positions close to the center of the substrate, when warpage of the substrate occurs, influence thereof appears uniformly. Therefore, even when warpage occurs in the substrate, the physical quantity sensor is hardly affected. Therefore, it is possible to prevent output fluctuation caused by an external stress, heat, or the like of the physical quantity sensor, and it is possible to detect a physical quantity with high accuracy.

In the embodiment, the support beam is a torsion spring configured to be twisted with the second direction as a rotation axis.

In this way, the movable body can perform the swing movement with the second direction as a rotation axis.

Further, the embodiment relates to an inertial measurement unit including a control unit configured to perform control based on a detection signal output from the physical quantity sensor.

Although the embodiments have been described in detail above, it will be easily understood by those skilled in the art that various modifications can be made without substantially departing from the novel matters and effects of the present disclosure. Accordingly, such modifications are intended to be included in the scope of the present disclosure. For example, a term cited with a different term having a broader meaning or the same meaning at least once in the description or in the drawings can be replaced with the different term at any place in the description or in the drawings. In addition, all combinations of the embodiments and the modifications are also included in the scope of the present disclosure. The configurations, operations, and the like of the physical quantity sensor and the inertial measurement unit are not limited to those described in the embodiments, and various modifications can be made.

What is claimed is:

1. A physical quantity sensor that detects, when three directions orthogonal to one another are defined as a first direction, a second direction, and a third direction, a physical quantity in the third direction, the physical quantity sensor comprising:
   a fixed portion fixed at a substrate;
   a support beam having one end coupled to the fixed portion and provided along the second direction;
   a movable body coupled to the other end of the support beam; and
   a first fixed electrode portion and a second fixed electrode portion which are provided at the substrate, wherein
   the movable body includes
   a first coupling portion coupled to the other end of the support beam and extending from the support beam in the first direction,
   a first base portion coupled to the first coupling portion and provided along the second direction,
   a first movable electrode portion including a first movable electrode, the first movable electrode extending from the first base portion in the first direction and facing a first fixed electrode of the first fixed electrode portion in the second direction, a second coupling portion coupled to the other end of the support beam and extending from the support beam in a fourth direction opposite to the first direction,
   a second base portion coupled to the second coupling portion and provided along the second direction,
   a second movable electrode portion including a second movable electrode, the second movable electrode extending from the second base portion in the first direction and facing a second fixed electrode of the second fixed electrode portion in the second direction, and
   a third fixed electrode portion and a fourth fixed electrode portion which are provided at the substrate,
   wherein
   the first movable electrode portion and the second movable electrode portion are provided at symmetrical positions in the first direction with respect to the support beam, and
   the movable body further includes
   a third base portion coupled to the first coupling portion and provided along the second direction,
   a third movable electrode portion including a third movable electrode, the third movable electrode extending from the third base portion in the fourth direction and facing a third fixed electrode of the third fixed electrode portion in the second direction,
   a fourth base portion coupled to the second coupling portion and provided along the second direction, and
   a fourth movable electrode portion including a fourth movable electrode, the fourth movable electrode extending from the fourth base portion in the fourth direction and facing a fourth fixed electrode of the fourth fixed electrode portion in the second direction.

2. The physical quantity sensor according to claim 1, wherein
   the third movable electrode portion and the fourth movable electrode portion are provided at symmetrical positions in the first direction with respect to the support beam.

3. The physical quantity sensor according to claim 1, wherein
   a thickness of the first movable electrode of the first movable electrode portion in the third direction is different from a thickness of the first fixed electrode of the first fixed electrode portion in the third direction, and
   a thickness of the second movable electrode of the second movable electrode portion in the third direction is different from a thickness of the second fixed electrode of the second fixed electrode portion in the third direction.

4. The physical quantity sensor according to claim 1, wherein
   a thickness of the first movable electrode of the first movable electrode portion in the third direction is larger than a thickness of the first fixed electrode of the first fixed electrode portion in the third direction, and
   a thickness of the second movable electrode of the second movable electrode portion in the third direction is larger than a thickness of the second fixed electrode of the second fixed electrode portion in the third direction.

5. The physical quantity sensor according to claim 1, wherein
   a thickness of the first movable electrode of the first movable electrode portion in the third direction is smaller than a thickness of the first fixed electrode of the first fixed electrode portion in the third direction, and a thickness of the second movable electrode of the second movable electrode portion in the third direction is smaller than a thickness of the second fixed electrode of the second fixed electrode portion in the third direction.

6. The physical quantity sensor according to claim 1, wherein positions of back surfaces of the first movable electrode portion and the first fixed electrode portion in the third direction coincide with each other, and positions of back surfaces of the second movable electrode portion and the second fixed electrode portion in the third direction coincide with each other.

7. The physical quantity sensor according to claim 1, wherein in a stationary state, a position of an end in the third direction of the first fixed electrode of the first fixed electrode portion is different from a position of an end in the third direction of the first movable electrode of the first movable electrode portion, a position of an end in a fifth direction of the first fixed electrode of the first fixed electrode portion is different from a position of an end in the fifth direction of the first movable electrode of the first movable electrode portion, the fifth direction being opposite to the third direction, a position of an end in the third direction of the second fixed electrode of the second fixed electrode portion is different from a position of an end in the third direction of the second movable electrode of the second movable electrode portion, and a position of an end in the fifth direction of the second fixed electrode of the second fixed electrode portion is different from a position of an end in the fifth direction of the second movable electrode of the second movable electrode portion.

8. The physical quantity sensor according to claim 1, wherein the support beam is a torsion spring configured to be twisted with the second direction as a rotation axis.

9. An inertial measurement unit comprising:

the physical quantity sensor according to claim 1; and a control unit configured to perform control based on a detection signal output from the physical quantity sensor.

* * * * *